(12) United States Patent
Kakuya et al.

(10) Patent No.: US 11,139,579 B2
(45) Date of Patent: Oct. 5, 2021

(54) LIGHT-TRANSMISSIVE ANTENNA, WINDOW AFFIXING TYPE COMMUNICATION MODULE, AND PERIPHERY MONITORING UNIT

(71) Applicant: DENSO CORPORATION, Kariya (JP)

(72) Inventors: Yuuji Kakuya, Nisshin (JP); Tsutomu Goto, Nisshin (JP); Katsuyuki Omura, Nisshin (JP); Yukikazu Suzuki, Nisshin (JP); Shiro Koide, Kariya (JP)

(73) Assignee: DENSO CORPORATION, Kariya (JP)

( * ) Notice: Subject to any disclaimer, the term of this patent is extended or adjusted under 35 U.S.C. 154(b) by 143 days.

(21) Appl. No.: 16/543,983

(22) Filed: Aug. 19, 2019

(65) Prior Publication Data

US 2019/0393613 A1 Dec. 26, 2019

Related U.S. Application Data

(63) Continuation of application No. PCT/JP2018/014203, filed on Apr. 3, 2018.

(30) Foreign Application Priority Data

Apr. 4, 2017 (JP) .............................. JP2017-074636
Mar. 28, 2018 (JP) .............................. JP2018-062699

(51) Int. Cl.
*H01Q 13/08* (2006.01)
*H01Q 1/22* (2006.01)
(Continued)

(52) U.S. Cl.
CPC .............. *H01Q 13/08* (2013.01); *B60R 1/12* (2013.01); *H01B 5/14* (2013.01); *H01Q 1/12* (2013.01);
(Continued)

(58) Field of Classification Search
CPC ........ H01Q 13/08; H01Q 1/22; H01Q 1/1271; H01Q 1/12; H01Q 1/38; H01Q 9/045; H01Q 1/3208; H01B 5/14
(Continued)

(56) References Cited

U.S. PATENT DOCUMENTS 5,872,542 A * 2/1999 Simons ................ H01Q 13/085
343/700 MS
2004/0004434 A1 * 1/2004 Nishi ................... H01L 51/5221
313/506
(Continued)

FOREIGN PATENT DOCUMENTS

CN 103329344 A 9/2013
CN 104009287 A 8/2014
(Continued)

OTHER PUBLICATIONS

Conformal coating, Wikipedia, https://en.wikipedia.org/w/index.php?title-Conformal_coating&oldid=629843502, Oct. 16, 2014.
(Continued)

*Primary Examiner* — Hai V Tran
(74) *Attorney, Agent, or Firm* — Harness, Dickey & Pierce, P.L.C.

(57) ABSTRACT

A light-transmissive antenna includes: a transparent base made of a transparent insulating material; and an antenna pattern formed on the transparent base. The antenna pattern is made of a transparent electrically conductive film that is a film-like member having a predetermined transmittance and a predetermined electrical conductivity. The light-transmissive antenna includes a plurality of highly electrically conductive patterns arranged on the antenna pattern, each of the highly electrically conductive patterns being made of an electrically conducive member having a higher electrical conductivity than the transparent electrically conductive film and formed in a linear shape. Each of the plurality of
(Continued)

highly electrically conductive patterns has a predetermined width set equal to or smaller than a value assumed as a resolution of human eyes.

15 Claims, 15 Drawing Sheets

(51) Int. Cl.
| | |
|---|---|
| *H01Q 1/38* | (2006.01) |
| *H01Q 1/12* | (2006.01) |
| *H01B 5/14* | (2006.01) |
| *H01Q 9/04* | (2006.01) |
| *B60R 1/12* | (2006.01) |
| *H01Q 1/32* | (2006.01) |

(52) U.S. Cl.
CPC ............ *H01Q 1/1271* (2013.01); *H01Q 1/22* (2013.01); *H01Q 1/3208* (2013.01); *H01Q 1/38* (2013.01); *H01Q 9/045* (2013.01); *H01Q 9/0428* (2013.01); *B60R 2001/1261* (2013.01)

(58) Field of Classification Search
USPC ...................................................... 343/700 R
See application file for complete search history.

(56) References Cited

U.S. PATENT DOCUMENTS

| | | | |
|---|---|---|---|
| 2005/0195114 A1 | 9/2005 | Yegin et al. | |
| 2008/0284850 A1 | 11/2008 | Blaesing et al. | |
| 2009/0051620 A1* | 2/2009 | Ishibashi ................ | H01Q 1/243 343/897 |
| 2009/0133922 A1* | 5/2009 | Okazaki ............... | H05K 9/0096 174/389 |
| 2009/0213012 A1 | 8/2009 | Jiang et al. | |
| 2009/0295285 A1* | 12/2009 | Tokunaga .......... | H01L 51/5212 313/505 |
| 2009/0295645 A1 | 12/2009 | Campero et al. | |
| 2011/0122036 A1* | 5/2011 | Leung .................. | H01Q 9/0485 343/785 |
| 2011/0273360 A1 | 11/2011 | Campero et al. | |
| 2013/0285861 A1* | 10/2013 | Kagaya .................. | H01Q 13/16 343/712 |
| 2014/0015716 A1 | 1/2014 | Villarroel et al. | |
| 2014/0104122 A1 | 4/2014 | Lee et al. | |
| 2014/0118179 A1* | 5/2014 | Alland ................. | H01Q 1/1271 342/22 |
| 2014/0292606 A1 | 10/2014 | Hayakawa et al. | |
| 2015/0029064 A1* | 1/2015 | Pan ...................... | H01Q 1/1271 343/720 |
| 2015/0061942 A1* | 3/2015 | Koyama .............. | H05K 1/0274 343/700 MS |
| 2016/0349354 A1 | 12/2016 | Yomo et al. | |

FOREIGN PATENT DOCUMENTS

| | | |
|---|---|---|
| CN | 102856628 B | 6/2016 |
| CN | 106199523 A | 12/2016 |
| DE | 10246607 B4 | 8/2014 |
| DE | 102014203185 A1 | 10/2014 |
| EP | 0911906 A2 | 4/1999 |
| EP | 2068328 A1 | 6/2009 |
| JP | H11177336 A | 7/1999 |
| JP | 2009533888 A | 9/2009 |
| JP | 201166610 A | 3/2011 |
| JP | 2013062828 A | 4/2013 |
| JP | 2013197987 A | 9/2013 |

OTHER PUBLICATIONS

Hyok Jae Song et al., A Method for Improving the Efficiency of Transparent Film Antennas, IEEE Antennas and Wireless Propagation Letters, IEEE, Piscataway, NJ, US, vol. 7, Jan. 1, 2008, pp. 753-756.

* cited by examiner

DISTANCE FROM MOUNTING SURFACE TO PATCH PATTERN [mm]

—— : WITH SLIT (SECOND EMBODIMENT)
----- : WITHOUT SLIT (COMPARISON EXAMPLE)

LIGHT-TRANSMISSIVE ANTENNA, WINDOW AFFIXING TYPE COMMUNICATION MODULE, AND PERIPHERY MONITORING UNIT

CROSS REFERENCE TO RELATED APPLICATION

The present application is a continuation application of International Patent Application No. PCT/JP2018/014203 filed on Apr. 3, 2018, which designated the U.S. and claims the benefit of priority from Japanese Patent Application No. 2017-074636 filed on Apr. 4, 2017 and Japanese Patent Application No. 2018-062699 filed on Mar. 28, 2018. The entire disclosures of all of the above applications are incorporated herein by reference.

TECHNICAL FIELD

The present disclosure relates to a light-transmissive antenna which is optically transparent antenna, a window affixing type communication module using the light-transmissive antenna, and a periphery monitoring unit including the light-transmissive antenna as an antenna for transmitting and receiving a probing wave.

BACKGROUND ART

A light-transmissive antenna includes a transparent film made of an electrically conductive composition such as tin-doped indium oxide (so-called transparent electrically conductive film) that is disposed on a transparent base such as glass so that the transparent electrically conductive film functions as a radiating element.

SUMMARY

According to an aspect of the present disclosure, a light-transmissive antenna includes: a transparent base made of a transparent insulating material; an antenna pattern formed on the transparent base, the antenna pattern being made of a transparent electrically conductive film that is a film-like member having a predetermined transmittance and a predetermined electrical conductivity; and a plurality of highly electrically conductive patterns arranged on the antenna pattern. Each of the highly electrically conductive patterns is made of an electrically conducive member having a higher electrical conductivity than the transparent electrically conductive film and formed in a linear shape. Each of the plurality of highly electrically conductive patterns has a predetermined width set equal to or smaller than a value assumed as a resolution of human eyes.

DESCRIPTION OF EMBODIMENTS

Figure 1:
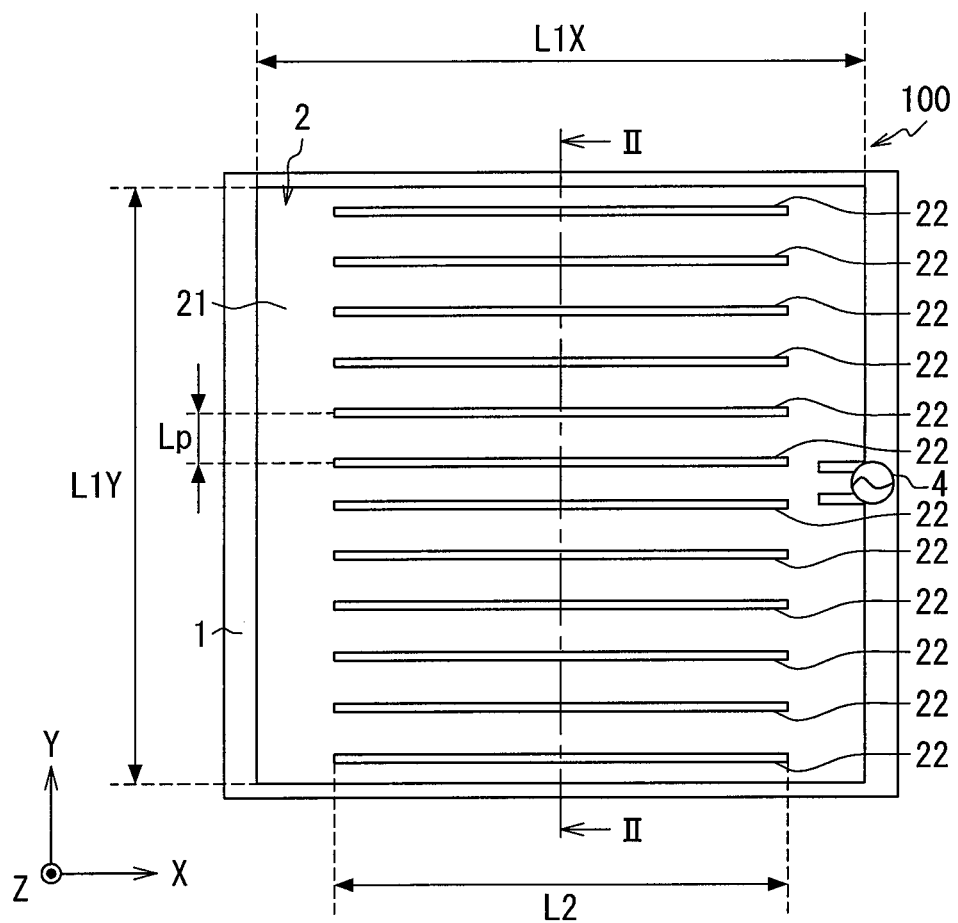
FIG. 1 is a top view of an antenna module according to a first embodiment.

To begin with, examples of relevant techniques will be described.

A light-transmissive antenna includes a transparent film made of an electrically conductive composition such as tin-doped indium oxide (so-called transparent electrically conductive film) that is disposed on a transparent base such as glass so that the transparent electrically conductive film functions as a radiating element.

Typically, the transmittance of light (mainly, visible light) and the electrical conductivity of a transparent electrically conductive film are in a trade-off relationship. That is, as the transmittance is increased, the electrical conductivity is reduced. For example, the electrical conductivity of a transparent electrically conductive film having a transmittance of 80% or higher is two or more orders of magnitude lower than the electrical conductivity of copper foil.

Thus, an antenna that uses a transparent electrically conductive film having a transmittance of 80% as a radiating element instead of copper foil has a considerably lower gain than an antenna that uses copper foil as a radiating element. In order to increase the gain, it is necessary to increase a filling density of the electrically conductive composition in the transparent electrically conductive film. However, in this case, the transmittance is reduced.

The present disclosure has been made in view of the above circumstances to provide a light-transmissive antenna, a window affixing type communication module, and a periphery monitoring unit that make it possible to increase the gain while preventing a reduction in the transmittance.

According to an aspect of the present disclosure, a light-transmissive antenna includes: a transparent base made of a transparent insulating material; an antenna pattern formed on the transparent base, the antenna pattern being made of a transparent electrically conductive film that is a film-like member having a predetermined transmittance and a predetermined electrical conductivity; and a plurality of highly electrically conductive patterns arranged on the antenna pattern. Each of the highly electrically conductive patterns is made of an electrically conducive member having a higher electrical conductivity than the transparent electrically conductive film and formed in a linear shape. Each of the plurality of highly electrically conductive patterns has a predetermined width set equal to or smaller than a value assumed as a resolution of human eyes.

According to the above configuration, the highly electrically conductive patterns having a relatively high electrical conductivity are arranged on a part of the antenna pattern which is made of the transparent electrically conductive film. Thus, it is possible to increase the intensity of current flowing during a drive and increase the gain as compared to a configuration as an assumed configuration in which an antenna pattern is made of only a transparent electrically conductive film. Further, the width of each of the highly electrically conductive patterns arranged on the antenna pattern is set equal to or smaller than the assumed value (e.g., 50 μm) of the resolution of human eyes. Thus, since the part of the antenna pattern includes the highly electrically conductive patterns, it is possible to prevent a reduction in the transmittance of the entire antenna pattern. That is, the above configuration makes it possible to increase the gain while preventing a reduction in the transmittance.

According to an aspect of the present disclosure, a window affixing type communication module includes: an antenna module which is the above-described light-transmissive antenna; and a signal processor that executes predetermined signal processing on a signal received by the antenna module. The antenna module is used in a state affixed to an inner face of a window glass of a vehicle.

The window affixing type communication module uses the light-transmissive antenna. The above configuration makes it possible to increase the success rate of receiving radio waves arriving from the outside of the cabin while ensuring the visibility of a driver to the outside of the cabin.

According to an aspect of the present disclosure, a periphery monitoring unit includes a camera, and a radar device that transmits a radio wave having a predetermined frequency as a probing wave and receives a reflected wave that is the probing wave reflected by an object to detect the object. The radar device includes: an antenna module which is the above-described light-transmissive antenna as an antenna for receiving the reflected wave; and a signal processor that executes predetermined signal processing on a signal received by the light-transmissive antenna to generate data indicating a position of the object. The antenna module is disposed on the front side of the camera at a position where at least a part of the antenna module is included in an imaging range of the camera.

The periphery monitoring unit is provided with the light-transmissive antenna as an antenna for transmitting and receiving the probing wave. The antenna module is configured as the light-transmissive antenna. Thus, even when the antenna module is disposed within the imaging range of the camera, the antenna module is less likely to affect an image captured by the camera. Since the antenna module can be disposed within the imaging range of the camera, it is possible to downsize the periphery monitoring unit.

First Embodiment

Hereinbelow, a first embodiment will be described with reference to the drawings. An antenna module 100 according to the present embodiment is configured to transmit and receive a radio wave having a predetermined frequency (hereinbelow, the target radio wave) by the principle of operation similar to a patch antenna. The antenna module 100 may be used in only either one of transmission or reception. The antenna module 100 corresponds to the light-transmissive antenna.

An operating frequency of the antenna module 100 (in other words, the frequency of the target radio wave) may be appropriately designed. In the present embodiment, as an example, the operating frequency is set to 24 GHz. For example, the antenna module 100 can be used as an antenna for transmitting and receiving a probing wave in a radar device. The operating frequency of the antenna module 100 may be appropriately designed and may be, for example, 300 MHz, 760 MHz, 930 MHz, 1.575 GHz, 2.4 GHz, or 5.9 GHz as another mode. Hereinbelow, the wavelength of the target radio wave is also referred to as the target wavelength. In the present embodiment, since the frequency of the target radio wave is 24 GHz, the target wavelength is 12.5 mm.

The antenna module 100 is, for example, connected to a radio device (not illustrated) through a coaxial cable. Signals received by the antenna module 100 are successively output to the radio device. The antenna module 100 converts an electric signal input from the radio device to a radio wave and emits the radio wave to a space. The radio device uses a signal received by the antenna module 100 and supplies high-frequency power corresponding to a transmission signal to the antenna module 100. The antenna module 100 and the radio device may be connected to each other through a matching circuit or a filter circuit instead of the coaxial cable.

Hereinbelow, the configuration of the antenna module 100 will be described.

Figure 2:
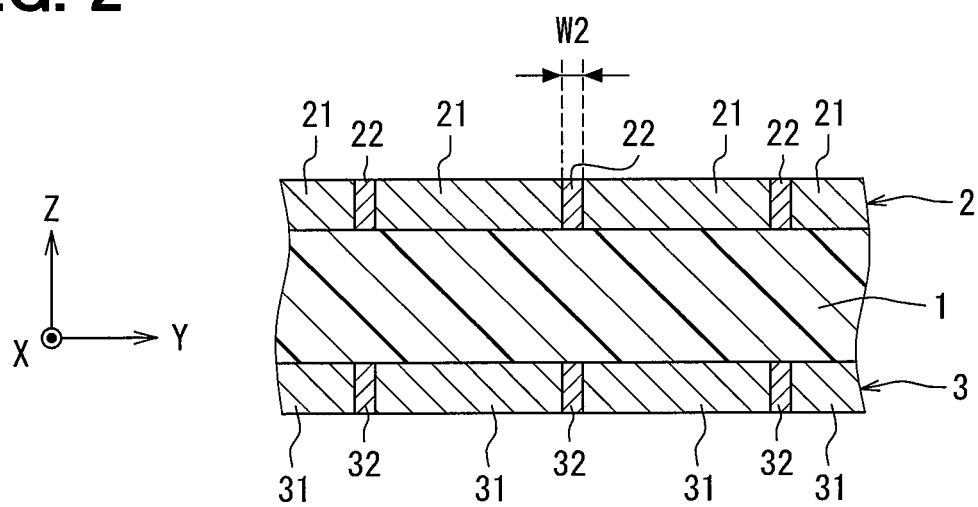
FIG. 2 is an enlarged view of a section taken along line II-II in FIG. 1.

Hereinbelow, the specific configuration of the antenna module 100 will be described. As illustrated in FIGS. 1 and 2, the antenna module 100 is provided with a transparent base 1, a patch pattern 2, and a ground pattern 3. FIG. 1 is a diagram illustrating the appearance of the antenna module 100 viewed from the upper direction (that is, a top view). FIG. 2 is a partially enlarged sectional view of the antenna module 100 taken along line II-II in FIG. 1. The upper direction for the antenna module 100 is a direction from the ground pattern 3 to the patch pattern 2.

The transparent base 1 is a plate-like member made of any transparent dielectric material (in other words, any electrical insulating material). The plate-like shape includes a thin-film shape such as a sheet shape or a film shape. The material of the transparent base 1 may be appropriately selected taking into consideration the transparency in a visible light region, the heat resistance, and the mechanical strength. In the present embodiment, as an example, the transparent base 1 is made of a resin film so as to have flexibility.

Various transparent materials including a polyester resin such as polyethylene terephthalate, an acrylic resin such as polymethyl methacrylate, a polycarbonate resin, a polyimide resin, a polyolefin resin such as a cycloolefin polymer, and a cellulosic resin such as triacetyl cellulose can be employed as resin of the resin film.

In the present embodiment, the transparent base 1 is configured to have a desired flexibility by using the resin film. However, the present disclosure is not limited thereto. The transparent base 1 may be made of a transparent rigid member such as glass, ceramics, or resin.

The patch pattern 2 is disposed on one face of the transparent base 1, and the ground pattern 3 is disposed on the other face thereof. For convenience, hereinbelow, in the transparent base 1, the face on which the patch pattern 2 is disposed is referred to as a front face, and the face opposite to the front face is referred to as a back face. The direction from the back face to the front face in the transparent base 1 corresponds to the upper direction for the antenna module 100. As illustrated in the sectional view of FIG. 2, the transparent base 1 has a function of supporting the patch pattern 2 and the ground pattern 3 so that the patch pattern 2 and the ground pattern 3 face each other with a predetermined distance therebetween. The thickness of the transparent base 1 is a parameter that should be appropriately designed. In the present embodiment, as an example, the thickness of the transparent base 1 is set to 100 μm.

The size and the shape of the transparent base 1 viewed from above (hereinbelow, the plane shape) may be a size and a shape that are necessary and sufficient for disposing a member such as the patch pattern 2. In the present embodiment, as an example, the transparent base 1 is formed in a rectangular shape. Alternatively, the shape of the transparent base 1 may be a circular shape (including an elliptical shape) or other polygonal shapes. A material having a desired relative dielectric constant (e.g., 2.3) can be used as the material of the transparent base 1.

The patch pattern 2 is an electrically conductive member formed in a thin-film shape. The patch pattern 2 is formed in a rectangular shape in which the length of a pair of opposite sides electrically corresponds to ½ of the target wavelength (hereinbelow, $\lambda/2$). Here, "$\lambda$" indicates one wavelength of the target radio wave. The patch pattern 2 functions as a radiating element of the patch antenna. The electrical length described herein is an effective length taking into consideration a fringing electric field and a wavelength shortening effect by a dielectric. If the wavelength of the target radio wave is shortened by the transparent base 1, the electric length may be half the shortened wavelength.

The present embodiment describes, as an example, a mode in which the plane shape of the patch pattern 2 is set to a rectangular shape. However, the present disclosure is not limited thereto. As another mode, the plane shape of the patch pattern 2 may be a circular shape (including an elliptical shape) whose diameter is set to a length electrically corresponding to $\lambda/2$. Further, the rectangular shape also includes a rectangular shape having rounded or cut-away corners and a rectangular shape having a recess, a projection, or a cut-away part on some of the edges thereof.

For convenience, hereinbelow, a concept of a three-dimensional coordinate system provided with X, Y, and Z axes which are perpendicular to each other are appropriately introduced to describe the configuration of the antenna module 100. The X axis is parallel to the side whose electrical length is set to $\lambda/2$ in the patch pattern 2. The Y axis is perpendicular to the X axis in a plane parallel to the patch pattern 2 including the X axis. The Z axis is perpendicular to the X axis and the Y axis, and the positive direction of the Z axis corresponds to the direction from the ground pattern 3 to the patch pattern 2.

The patch pattern 2 is provided with a base pattern 21 which is made of a transparent electrically conductive film having a predetermined transmittance and a predetermined electrical conductivity and a plurality of highly electrically conductive patterns 22 which is made of an electrically conductive film having a higher electrical conductivity than the transparent electrically conductive film so as to have a desired transmittance (e.g., 80%) as a whole. That is, the patch pattern 2 is formed as the combination of two kinds of electrically conductive films having different electrical conductivities (in other words, transmittances). The patch pattern 2 corresponds to the antenna pattern.

The base pattern 21 made of the transparent electrically conductive film provides an overall shape of the patch pattern 2. That is, the base pattern 21 is formed in a rectangular shape whose length L1X in the X-axis direction electrically corresponds to ½ of the target wavelength. A length L1Y in the Y-axis direction may be appropriately designed. For example, the length L1Y in the Y-axis direction is set to a value electrically corresponding to ½ to ⅓ of the target wavelength (that is, $\lambda/2$ to $\lambda/3$).

A feeding point 23 is disposed on an intermediate point of an edge of the base pattern 21, the edge being parallel to the Y axis. The feeding point 23 electrically connects an inner conductor of the coaxial cable and the patch pattern 2 (specifically, the base pattern 21). The electrical connection between the internal conductor of the coaxial cable and the patch pattern 2 may be implemented using a conductive pin (hereinbelow, the feeding pin). As another mode, the power feeding to the patch pattern 2 may be implemented by an electromagnetic coupling feeding method using a microstrip line.

In the present embodiment, the feeding point is disposed on the intermediate point of the edge of the patch pattern 2, the edge being located on the right end in the drawing. However, the feeding point may be disposed in another place. For example, the feeding point 23 may be disposed on the center of the patch pattern 2. The feeding point 23 may be disposed on a straight line that is parallel to the X axis and passes through the center of the patch pattern 2 (hereinbelow, the horizontal center line). When the feeding point 23 is disposed on the horizontal center line, the patch pattern 2 functions as the radiating element of the patch antenna. The patch pattern 2 may be provided with a cut-away part which functions as a degeneracy separation element or a perturbation element or may be provided with the feeding points at two positions so as to be capable of transmitting and receiving a circularly polarized wave.

The feeding point 23 is preferably disposed at a position that enables impedance matching between the coaxial cable and the antenna module 100 at the operating frequency. A state with matched impedance is not limited to a completely matched state, but also includes a state in which a loss caused by an impedance mismatch is within a predetermined allowable range.

For example, an ITO film including indium tin oxide (ITO) as an electrically conductive composition or a GZO film including GZO as an electrically conductive composition, the GZO being obtained by doping gallium into zinc oxide, can be employed as the transparent electrically conductive film which constitutes the base pattern 21. Of course, alternatively, an AZO film obtained by doping aluminum into zinc oxide can also be employed. As an example, the base pattern 21 of the present embodiment is made of an ITO film. In view of the manufacturing cost, the base pattern 21 is preferably made of, for example, GZO which is a substitute material of ITO. The electrically conductive composition may be appropriately selected taking the cost and a required performance into consideration.

Figure 3:
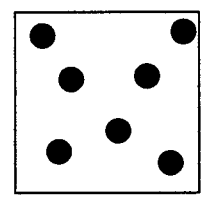
FIG. 3 is a diagram conceptually illustrating a filling amount of an electrically conductive composition in a base pattern.

Typically, the transmittance and the electrical conductivity of a transparent electrically conductive film are determined by a filling factor (in other words, the concentration) of an electrically conductive composition. As the filling factor of the electrically conductive composition increases, the electrical conductivity increases, but the transmittance decreases. The base pattern 21 of the present embodiment is made of an ITO film that is filled with an electrically conductive composition (here, ITO) so as to have a transmittance of 85% in a visible light wavelength region of 380 nm to 780 nm. FIG. 3 conceptually illustrates a filling amount of the electrically conductive composition in the base pattern 21. A result of a simulation of the electrical conductivity of the base pattern 21 having a transmittance of 85% is $0.3 \times 10^6$ S/m.

Figure 4:
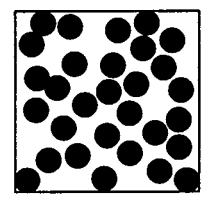
FIG. 4 is a diagram conceptually illustrating a filling amount of an electrically conductive composition in a highly electrically conductive pattern.

The highly electrically conductive pattern 22 is made of an ITO film filled with an electrically conductive composition (here, ITO) more densely than the transparent electrically conductive film constituting the base pattern 21. FIG. 4 conceptually illustrates a filling amount of the electrically conductive composition in the highly electrically conductive pattern 22. The highly electrically conductive pattern 22 of the present embodiment is filled with the electrically conductive composition so that the transmittance becomes 0% and the electrical conductivity becomes $30 \times 10^6$ S/m. The base pattern 21 and the highly electrically conductive pattern 22 do not necessarily have to be made of the same electrically conductive composition. The base pattern 21 and the highly electrically conductive pattern 22 may be made of different electrically conductive compositions. For example, the base pattern 21 may be a GZO film.

Each of the plurality of highly electrically conductive patterns 22 is formed in a straight line shape having a predetermined width W2. The width W2 of the highly electrically conductive pattern 22 may be set to a value smaller than the resolution of human eyes. Although the resolution of human eyes itself, of course, varies between individuals, an assumed value of the resolution of human eyes is set to 50 µm in the present embodiment. That is, the highly electrically conductive pattern 22 is an electrically conductive member having a straight line shape in which the width W2 is set to 50 µm or less. For example, the width W2 of the highly electrically conductive pattern 22 is set to 30 µm. FIG. 1 and the like illustrate the width W2 of the highly electrically conductive pattern 22 in an exaggerated manner. A length L2 of the highly electrically conductive pattern 22 may be set to, for example, a length electrically corresponding to $\lambda/4$.

Figure 5A:
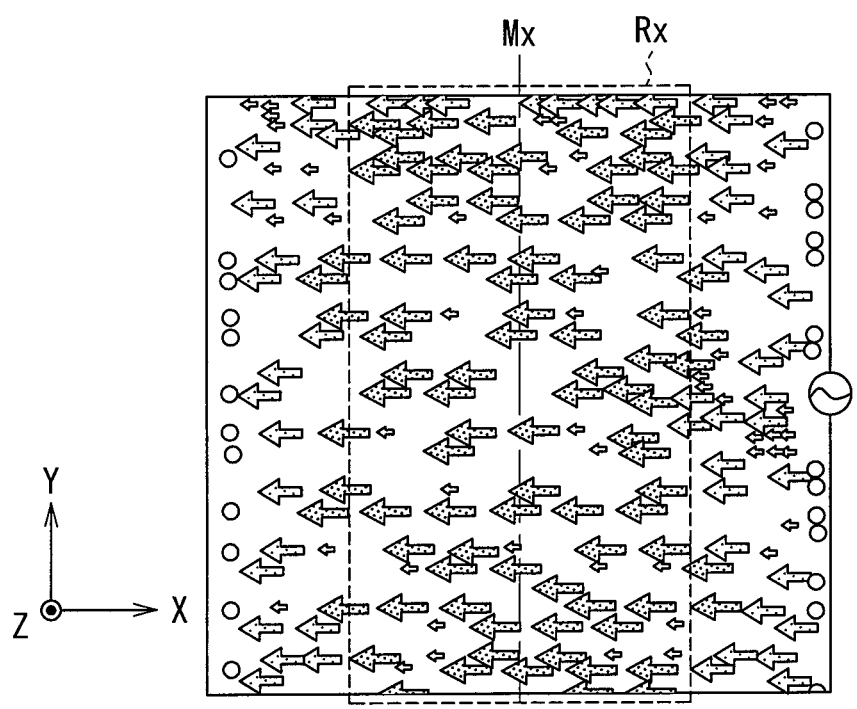
FIG. 5A is a diagram illustrating a current distribution in a patch pattern.
Figure 5B:
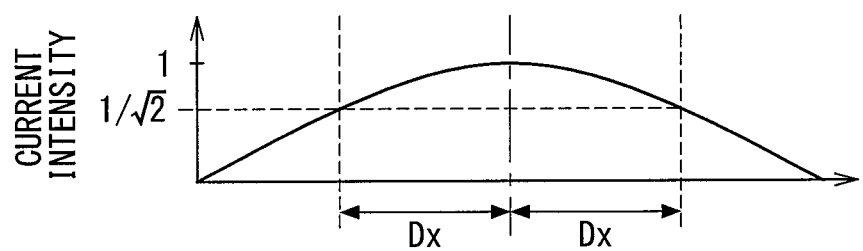
FIG. 5B is a diagram illustrating the current distribution in the patch pattern.

The plurality of highly electrically conductive patterns 22 are arranged in a region where a relatively strong current is induced during resonance in the patch pattern 2. FIGS. 5A and 5B illustrate a result of a simulation of a current distribution during resonance in a patch antenna in which the entire faces of a patch pattern and a ground pattern are made of a transparent conductor film having a transmittance of 80% and an electrical conductivity of $0.3 \times 10^6$ S/m. As illustrated in FIGS. 5A and 5B, in the patch antenna, current flows parallel to the X axis during resonance, and the intensity of the current is highest in a central region in the X-axis direction. That is, current contributing to the radiation of radio waves is concentrated on the central region in the X-axis direction. Hereinbelow, the resonance current flowing direction is also referred to as the resonance current direction. In the present embodiment, as described above, the resonance current direction is parallel to the X axis.

A central region Rx of the patch pattern 2 may be within a predetermined distance Dx in the X-axis direction from a line segment Mx which is located on the middle in the X-axis direction. In the present embodiment, the central region Rx of the patch pattern 2 is a region in which the current intensity is equal to or higher than $1/\sqrt{2}$ of the maximum amplitude. The region in which the current intensity is equal to or higher than $1/\sqrt{2}$ of the maximum amplitude may be identified by a simulation. The plurality of highly electrically conductive patterns 22 are arranged side by side in the Y-axis direction in such a manner that each of the highly electrically conductive patterns 22 extends across the central region Rx of the patch pattern 2 (in other words, in parallel to the X-axis direction). An interval Lp between the highly electrically conductive patterns 22 (pattern interval) is appropriately designed taking into consideration a required radiant gain and the transparency (in other words, the transmittance) of the entire patch pattern.

As described above, the width W2 of the highly electrically conductive pattern 22 is set to a value with which the highly electrically conductive pattern 22 is almost invisible by human eyes. However, since the highly electrically conductive pattern 22 is an electrically conductive member having a transmittance of 0%, when the pattern interval Lp is set to a relatively small value to densely arrange the plurality of highly electrically conductive patterns 22, the transmittance may be reduced as a whole. However, as described below, as the pattern interval Lp is reduced, the electrical conductivity of the entire patch pattern 2 increases. Thus, the radiant gain may be improved. In view of the above, the pattern interval Lp is preferably set to, for example, 200 µm.

The ground pattern 3 is an electrically conductive member formed in a thin-film shape. The ground pattern 3 has the same size as the patch pattern 2 or is larger than the patch pattern 2. The ground pattern 3 is electrically connected to an external conductor of the coaxial cable to provide a ground potential in the patch antenna.

The ground pattern 3 is provided with a base pattern 31 which is made of a transparent electrically conductive film and a plurality of highly electrically conductive patterns 32 which is made of an electrically conductive film having a higher electrical conductivity than the transparent electrically conductive film in a manner similar to the patch pattern 2. The base pattern 31 of the ground pattern 3 has a configuration similar to the configuration of the base pattern 21 of the patch pattern 2. The highly electrically conductive pattern 32 of the ground pattern 3 has a configuration similar to the configuration of the highly electrically conductive pattern 22 of the patch pattern 2. The highly electrically conductive pattern 32 corresponds to a ground side highly electrically conductive pattern. The highly electrically conductive patterns 32 of the ground pattern 3 are preferably arranged at positions facing the respective highly electrically conductive patterns 22 of the patch pattern 2. Such a mode makes it possible to further increase the current intensity.

The antenna module 100 configured as described above is driven by the principle of operation similar to the patch antenna to transmit and receive the target radio wave.

Hereinbelow, effects of the present embodiment will be described.

Figure 6:
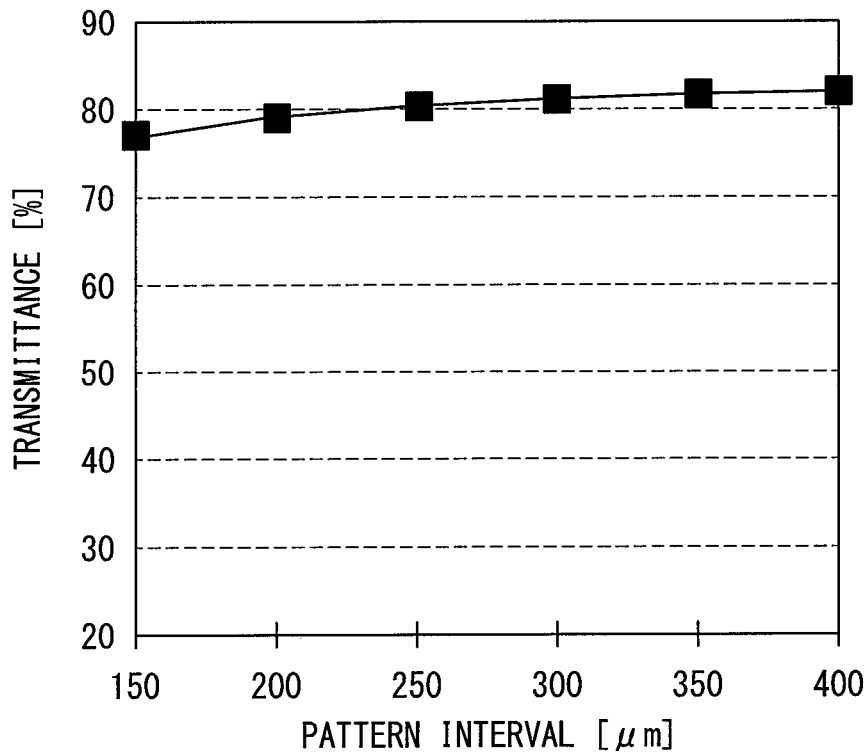
FIG. 6 is a graph illustrating a result of a test of the relationship between a pattern interval and a transmittance.

FIG. 6 illustrates a result of a measurement of the transparency (in other words, the transmittance) of the entire antenna module 100 in the visible light region when the pattern interval Lp is adjusted in the antenna module 100. The transmittance of the entire antenna module 100 corresponds to the transmittance of a configuration in which the patch pattern 2, the transparent base 1, and the ground pattern 3 are stacked. An additional highly electrically conductive pattern 22 is arranged in a space generated by reducing the pattern interval Lp. That is, in the patch pattern 2, the number of highly electrically conductive patterns 22 arranged side by side in the Y-axis direction corresponds to an integer part of a value obtained by dividing the length L1Y in the Y-axis direction by the pattern interval Lp.

As illustrated in FIG. 6, the configuration of the present embodiment makes it possible to achieve a transmittance of 75% or higher when the pattern interval Lp is set to any value in the range of 150 μm to 400 μm. In particular, when the pattern interval Lp is set to 200 μm or larger, a transmittance of approximately 80% is achieved. The reason why the entire transmittance decreases as the pattern interval Lp is narrowed is that the number of highly electrically conductive patterns 22 arranged on the patch pattern 2 increases to increase the ratio of opaque highly electrically conductive patterns 22 in the patch pattern 2.

Figure 7:
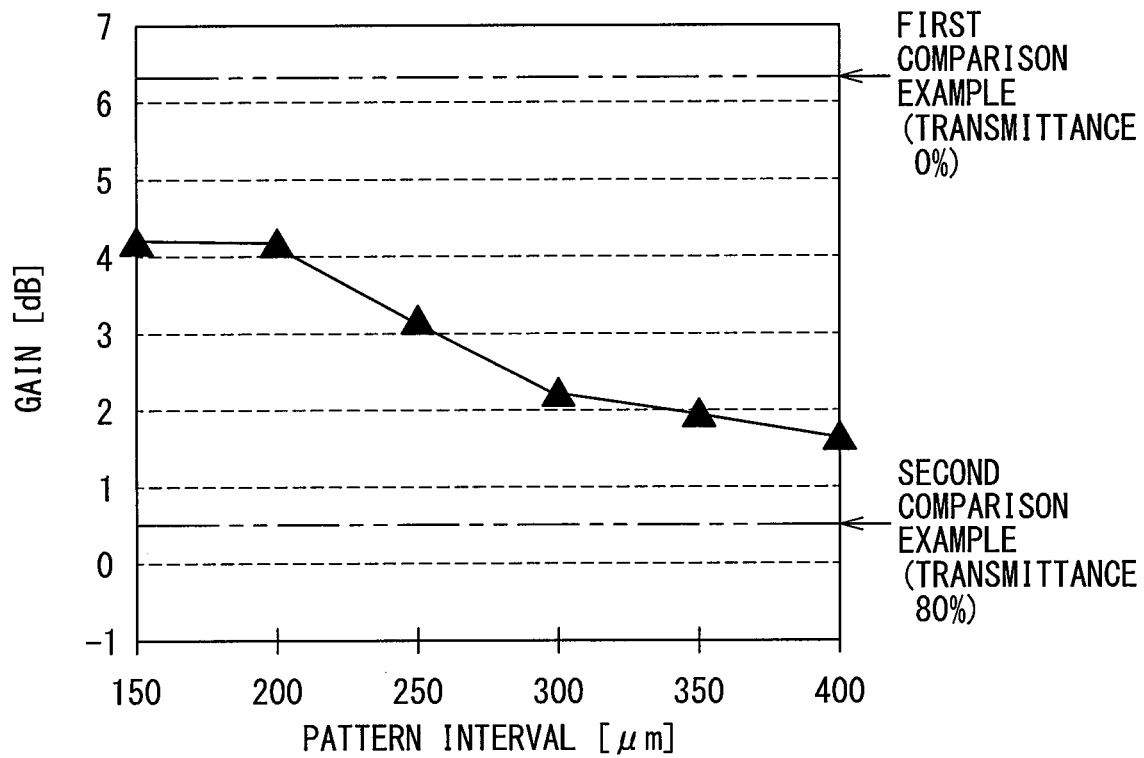
FIG. 7 is a graph illustrating a result of an analysis of the relationship between the pattern interval and a gain.

FIG. 7 illustrates a result of a simulation of the gain of the antenna module 100 when the pattern interval Lp is adjusted in the antenna module 100. A solid line in FIG. 7 indicates the gain of the antenna module 100. A dot-dash line in FIG. 7 indicates a gain (specifically, 6.3 dBi) in a conventional patch antenna in which a patch pattern and a ground pattern are formed of copper foil having an electrical conductivity of 58×10^6 S/m as a first comparative configuration.

A two-dot chain line in FIG. 7 indicates a gain (specifically, 0.5 dBi) in a patch antenna in which the entire faces of a patch pattern and a ground pattern are made of a transparent conductor film having a transmittance of 80% and an electrical conductivity of 0.3×10^6 S/m as a second comparative configuration. Each of the antenna modules as the first and second comparative configurations is configured to operate as a patch antenna at the same frequency as the antenna module 100, and the position of the feeding point and the dimension of each member are the same as those of the antenna module 100.

As illustrated in FIG. 7, the present embodiment makes it possible to achieve a gain of 4 dBi or more by setting the pattern interval Lp to 200 μm or less. Specifically, when the pattern interval Lp is set to 200 μm, the antenna module 100 which provides a gain of 4.2 dBi can be obtained. The gain of the second comparative configuration which has a transmittance of 80% is 0.5 dBi. Thus, the configuration in which the pattern interval Lp is set to 200 μm in the antenna module 100 can achieve a gain 3.7 dB higher than the gain of the second comparative configuration.

As illustrated in FIG. 7, the configuration in which the pattern interval Lp is set to 200 μm in the antenna module 100 has a transmittance of approximately 80%. That is, the configuration of the present embodiment makes it possible to increase the gain by 3.7 dB while achieving the transmittance of the same level as the second comparative configuration.

In Japan, a component having a transmittance of 70% or higher is permitted to be affixed to a windshield of a vehicle. That is, since the antenna module 100 of the present embodiment achieves a transmittance of 75% or higher, the antenna module 100 can be used in a state affixed to a windshield of a vehicle. Thus, the antenna module 100 of the present embodiment is suitable not only for transmission and reception of radar waves, but also as an antenna that is affixed to the windshield and used for receiving radio waves arriving from the outside of the vehicle in a zenith direction or a horizontal direction. Specifically, the antenna module 100 is also suitable as an antenna for communicating with a roadside device, an antenna for receiving radio waves from a navigation satellite, or an antenna for receiving radio broadcast waves.

As described above, in the configuration disclosed as the present embodiment, the gain of the antenna can be increased by arranging the linear electrically conductive members having a relatively high electrical conductivity (that is, the highly electrically conductive patterns 22) along the direction of current induced by the patch pattern as the radiating element. Further, the transmittance of the entire antenna module 100 can be maintained at a high level by forming each of the highly electrically conductive patterns 22 with a thinness that is difficult to visually recognize and setting the interval Lp between the highly electrically conductive patterns 22 to a value sufficiently larger than the width W2 of the highly electrically conductive patterns 22. That is, the configuration disclosed as the present embodiment makes it possible to achieve both a high gain and a high transmittance of the antenna.

In the present embodiment, in addition to the patch pattern 2 as the radiating element, the highly electrically conductive patterns 32 each having a fine-linear shape are arranged at predetermined intervals on the ground pattern 3 which provides the ground potential. Such a configuration makes it possible to increase the gain as compared to a configuration in which the highly electrically conductive patterns 22 are arranged only on the patch pattern 2.

In the present embodiment, the length of the highly electrically conductive patterns 22 is set so that the highly electrically conductive patterns 22 extend across the central region Rx of the patch pattern 2. Such a configuration makes is possible to make the current intensity during a drive larger than that in a configuration described as a first modification. As a result, it is possible to increase the gain as an antenna.

While the embodiment of the present disclosure is described, the present disclosure is not restricted to the embodiment mentioned. The technical scope of the present disclosure includes the following embodiments and modifications. The present disclosure can be implemented with other various modification in the range not deviating from the scope of the present disclosure. For example, the embodiments and the modifications may be partially combined, provided there is no harm in the combination.

A component that has the same function as the component described in a preceding embodiment is assigned with the same reference numeral, and the redundant explanation is omitted. When only a part of a configuration is described, a preceding embodiment may be applied to the other parts of the configuration.

[First Modification]

Figure 8:
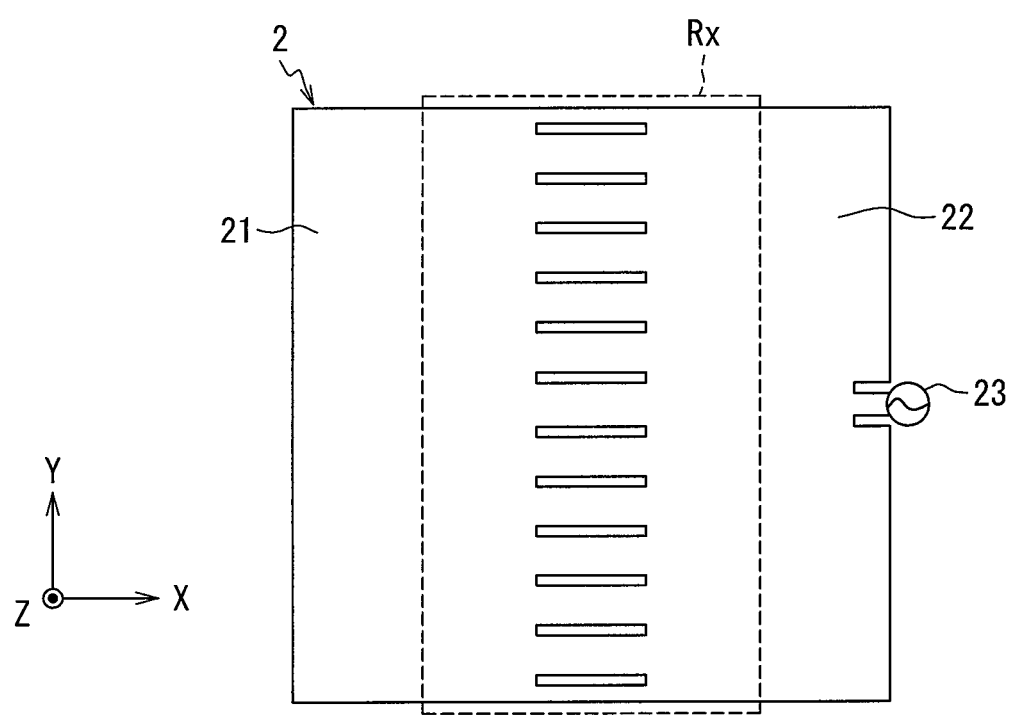
FIG. 8 is a diagram conceptually illustrating the configuration of a patch pattern in a first modification.

The above embodiment discloses the mode in which the highly electrically conductive patterns 22 extend across the central region Rx of the patch pattern 2 (in other words, the highly electrically conductive patterns 22 are sufficiently long). However, the present disclosure is not limited thereto. It is only required that the highly electrically conductive patterns 22 be locally arranged along the resonance current direction in a part where a strong current flows. For example, as illustrated in FIG. 8, the length L2 of the highly electrically conductive patterns 22 may be set relatively short. For example, the length L2 of the highly electrically conductive patterns 22 may be set to electrically ⅛ or 1/10 of the target wavelength. The same applies to the highly electrically conductive patterns 32 arranged on the ground pattern 3.

Further, the highly electrically conductive patterns 22 may be formed in a curved shape or a bent shape. Further, it is only required that the highly electrically conductive patterns 22 be made of a member having a higher electrical conductivity than the base pattern 21. Thus, the highly electrically conductive patterns 22 do not necessarily have to be an ITO film that is filled with an electrically conductive composition so as to have a transmittance of 0%. For example, a transparent electrically conductive film having a transmittance of 25% or 50% may be used.

[Second Modification]

Figure 9:
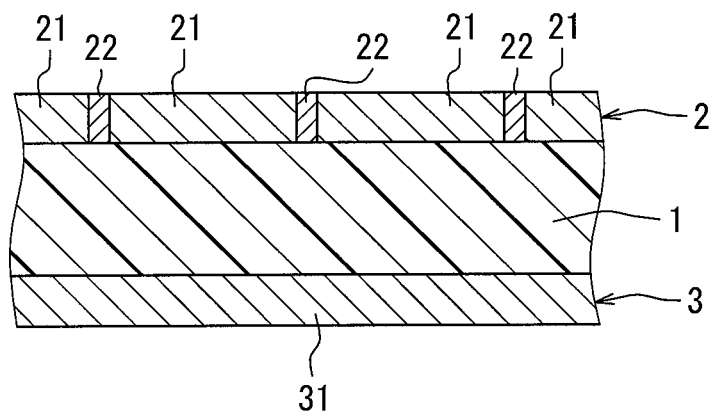
FIG. 9 is a diagram for describing the configuration of an antenna module in a second modification.

The above embodiment discloses the configuration in which the highly electrically conductive patterns 32 are arranged on the ground pattern 3. However, the present disclosure is not limited thereto. As illustrated in FIG. 9, a configuration in which no highly electrically conductive pattern 32 is arranged on the ground pattern 3 can also be employed.

[Third Modification]

Figure 10:
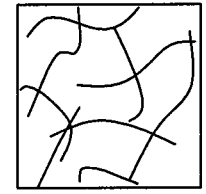
FIG. 10 is a diagram for describing the configuration of an antenna module in a third modification.

The above embodiment discloses the configuration in which the transparent electrically conductive film made of a granular (powdered) electrically conductive composition is employed as the transparent electrically conductive film for constituting the base patterns 21, 31. However, the present disclosure is not limited thereto. The transparent electrically conductive film as the base patterns 21, 31 may be a transparent electrically conductive film including an electrically conductive member having a wire shape (e.g., a silver nanowire) as the electrically conductive composition as illustrated in FIG. 10. In addition to silver, metals such as gold, copper, platinum, tin, aluminum, iron, and nickel, and various alloy materials can be employed as the electrically conductive member having a wire shape.

[Fourth Modification]

Each of the highly electrically conductive patterns 22 may be not an electrically conductive film, but a conductor having a fine-linear shape. The fine line indicates a line having a width of 50 μm or less.

[Fifth Modification]

Figure 11:
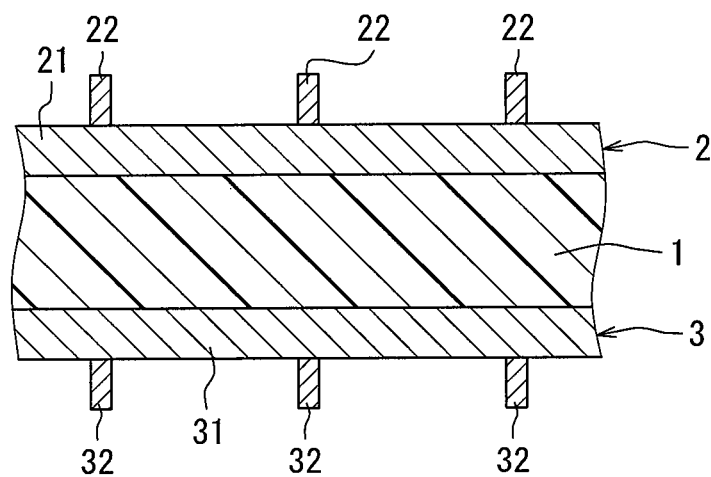
FIG. 11 is a diagram illustrating an example of the configuration of an antenna module in a fifth modification.

The above embodiment discloses, as the configuration of the patch pattern 2, the configuration in which the base pattern 21 and the highly electrically conductive patterns 22 are arranged in such a manner that the base pattern 21 and the highly electrically conductive patterns 22 do not overlap each other. However, the present disclosure is not limited thereto. As illustrated in FIG. 11, the highly electrically conductive patterns 22 may be arranged on the base pattern 21 so that the base pattern 21 and the highly electrically conductive patterns 22 overlap each other. The same applies to the ground pattern 3.

[Sixth Modification]

Figure 12:
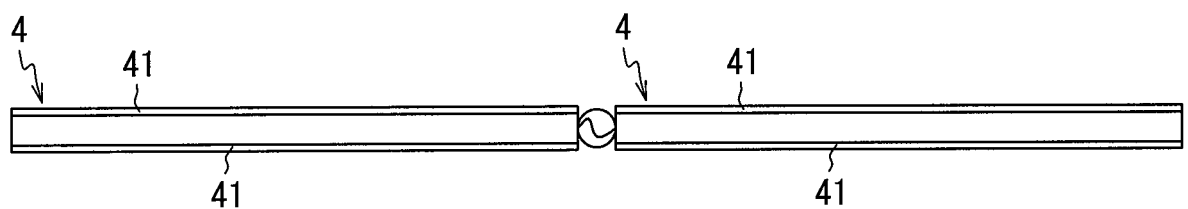
FIG. 12 is a diagram illustrating an example of the configuration of an antenna module in a sixth modification.
Figure 13:
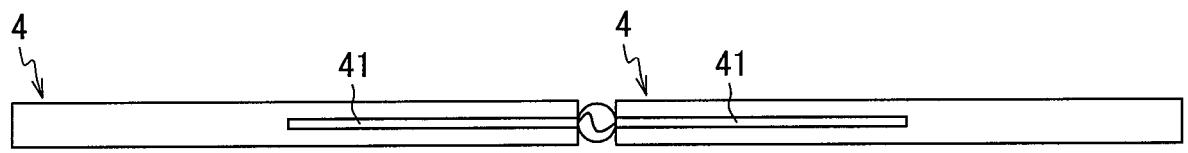
FIG. 13 is a diagram illustrating an example of the configuration of the antenna module in the sixth modification.

The above embodiment discloses the mode in which the present disclosure is applied to the patch antenna. However, the present disclosure is not limited thereto. The present disclosure is applicable to various antenna modules such as a dipole antenna and an inverted F antenna. If the present disclosure is applied to a dipole antenna, a transparent electrically conductive film may be used as a principal constituent element of a linear element 4 included in the dipole antenna, and highly electrically conductive patterns 41 may be arranged on edges along the longitudinal direction as illustrated in FIG. 12. The highly electrically conductive pattern 41 is a configuration having a technical significance similar to the highly electrically conductive pattern 22 in the above embodiments. As illustrated in FIG. 13, the highly electrically conductive pattern 41 may extend from a feeding point to the other end on the central part of the linear element 4. FIGS. 12 and 13 illustrate the width of the linear element 4 and the width of the highly electrically conductive pattern 41 in an exaggerated manner.

[Seventh Modification]

Figure 14:
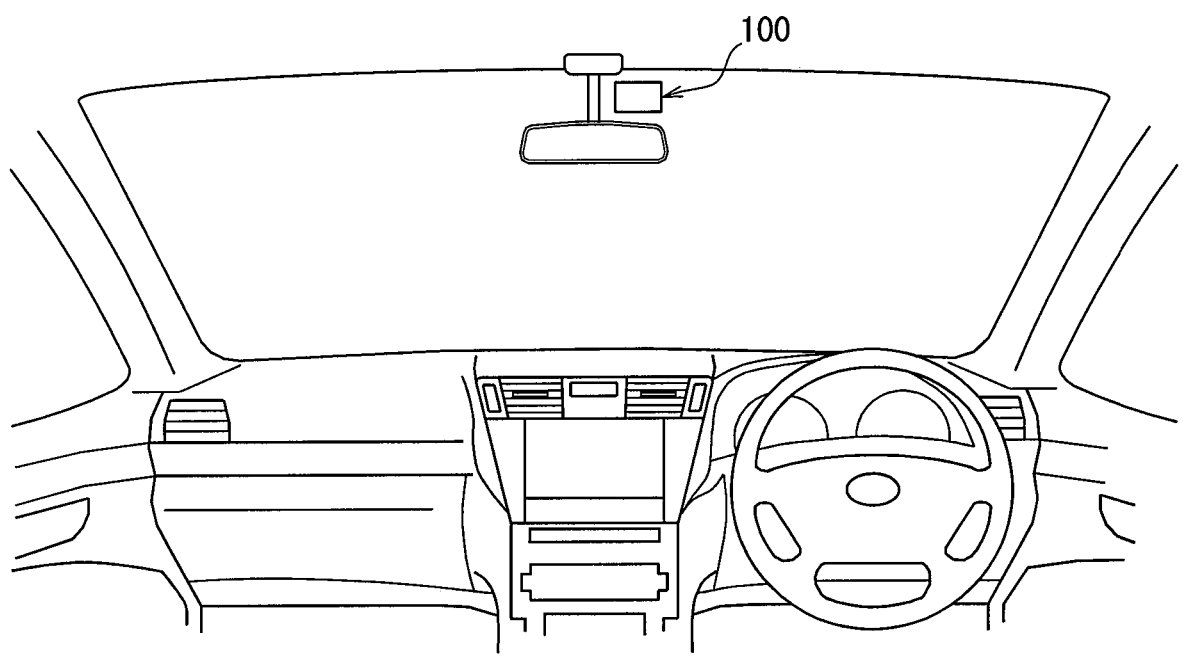
FIG. 14 is a diagram illustrating an example of a usage mode of the antenna module.

For example, as illustrated in FIG. 14, the antenna module 100 according to the first embodiment is used in a state affixed to the inner face of a windshield 10 of the vehicle in an attitude in which the transmission and reception direction of the target radio wave faces the outside of the cabin. The attitude in which the transmission and reception direction of the target radio wave faces the outside of the cabin indicates, for example, an attitude in which the direction of the center of the directivity faces the outside of the cabin. Further, the attitude in which the transmission and reception direction of the target radio wave faces the outside of the cabin substantially corresponds to an attitude in which the patch pattern 2 faces the outside of the cabin.

With such a mounting attitude, the antenna module 100 is capable of transmitting a signal from the windshield 10 toward the outside of the cabin (that is, toward the front of the vehicle). Further, with the above mounting attitude, the antenna module 100 is capable of receiving a radio wave arriving from the front of the vehicle. The antenna module 100 may be used in only either one of transmission or reception. The transmission and reception direction of the antenna module 100 corresponds to the direction in which the antenna module 100 operates (hereinbelow, the operating direction).

A more preferred configuration of the antenna module 100 based on the premise that the antenna module 100 is used in the above mounting attitude is disclosed as the seventh modification. The mounting surface in the following description indicates a surface to which the antenna module 100 is affixed. Specifically, the mounting surface indicates a part of the inner face of the windshield 10 to which the antenna module 100 is affixed.

Figure 15:
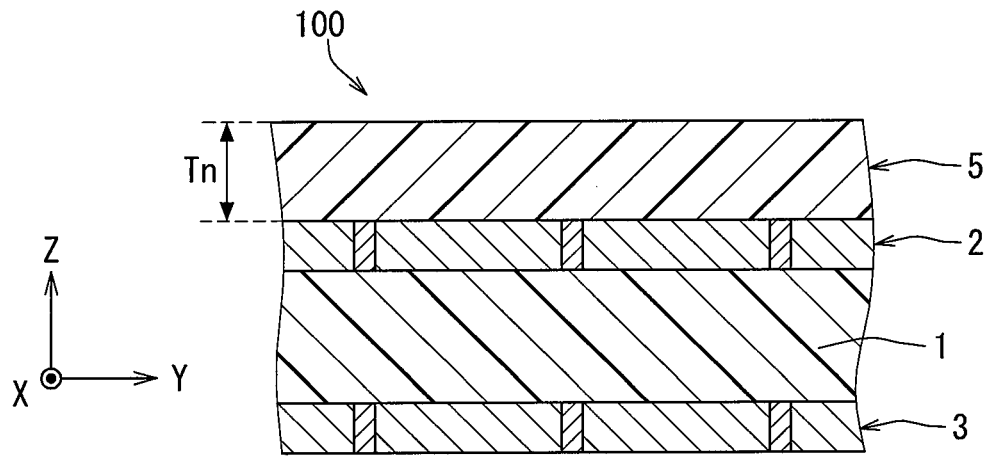
FIG. 15 is a diagram for describing the configuration of an antenna module in a seventh modification.

As illustrated in FIG. 15, in the antenna module 100 of the present modification, a second transparent base 5 is stacked on the upper side of the patch pattern 2. In order to distinguish the transparent base 1 from the second transparent base 5, hereinbelow, the transparent base 1 is also referred to as the first transparent base 1. The configuration in which the second transparent base 5 is disposed on the patch pattern 2 corresponds to a configuration in which an intermediate layer is disposed between the windshield 10 which serves as the mounting surface for the antenna module 100 and the patch pattern 2.

The second transparent base 5 is used for adjusting the separation distance between the windshield 10 and the patch pattern 2 to prevent a reduction in a gain caused by a reflected wave generated on the windshield 10. The gain described herein mainly indicates a gain in the direction from the ground pattern 3 to the patch pattern 2 (hereinbelow, the perpendicular-to-antenna direction).

A thickness Tn of the second transparent base 5 is set to, for example, a value electrically corresponding to half the target wavelength (that is, the half wavelength, $\lambda/2$). The value electrically corresponding to $\lambda/2$ is an effective length taking the wavelength shortening effect obtained by the second transparent base 5 into consideration. If the relative dielectric constant of the second transparent base 5 is 2.3, the wavelength of the target radio wave within the second transparent base 5 is 8.3 mm. Thus, the configuration in which the thickness Tn of the second transparent base 5 is set to the value electrically corresponding to $\lambda/2$ is a configuration in which the thickness Tn is set to approximately 4.15 mm. The thickness Tn of the second transparent base 5 may be set to an integral multiple of (e.g., twice or three times) the value electrically corresponding to $\lambda/2$.

The above setting of the thickness Tn of the second transparent base 5 is performed by focusing on the point that the gain as an antenna varies according to the thickness Tn of the second transparent base 5. That is, when the thickness Tn is set to a value electrically corresponding to $0.75\lambda$, a reflected wave generated on the mounting surface acts in the direction cancelling a direct wave to reduce the gain as an antenna. On the other hand, when the separation distance between the patch pattern 2 and the mounting surface is set to electrically an integral multiple of half the target wavelength, the reflected wave is in phase with the direct wave. Thus, it is possible to prevent a reduction in the gain caused by the reflected wave. The expression of "$0.75\lambda$" indicates a value obtained by multiplying the wavelength of the target radio wave by 0.75. Further, hereinbelow, the expression of "$0.5\lambda$" indicates a value obtained by multiplying the target wavelength by 0.5. The expression of "$0.5\lambda$" has the same meaning as "$\lambda/2$" described above.

Figure 16:
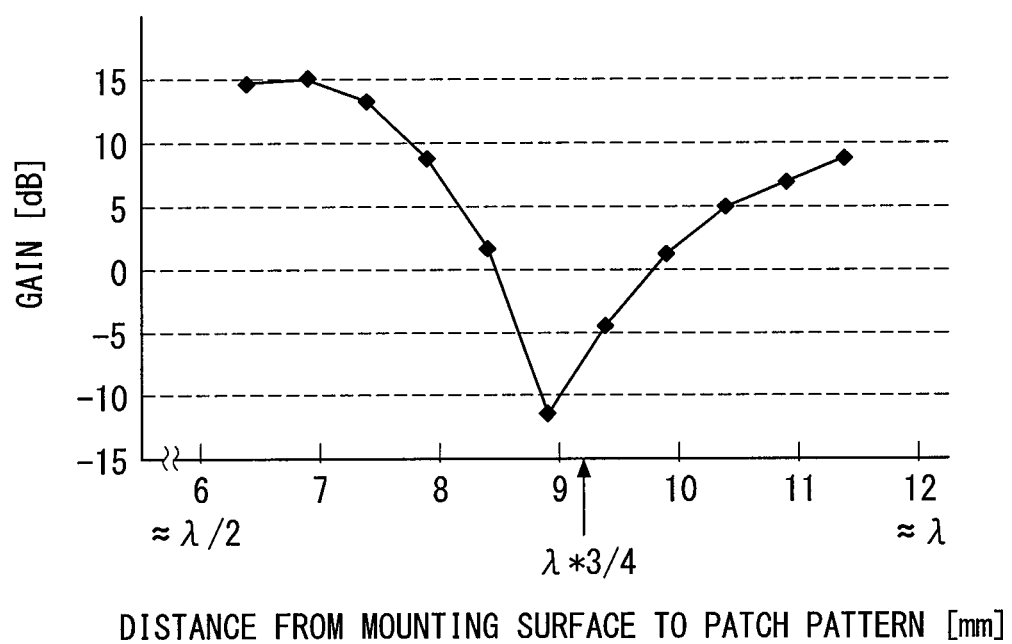
FIG. 16 is a graph illustrating a result of a simulation of the relationship between the distance from a mounting surface to the patch pattern and the gain.

FIG. 16 illustrates a result of a simulation of the relationship between the separation distance between the patch pattern 2 and the windshield 10 and the gain in a configuration in which a space between the patch pattern 2 and the windshield 10 is hollow. As illustrated in FIG. 16, in the configuration in which the space between the patch pattern 2 and the windshield 10 is hollow, when, for example, the separation distance between the patch pattern 2 and the windshield 10 is set to approximately 6.3 mm which electrically corresponds to $0.5\lambda$, the gain of the antenna module 100 becomes highest.

Thus, it is preferred that the second transparent base 5 whose thickness Tn is an integral multiple of a value electrically corresponding to $0.5\lambda$ be disposed on the upper side of the patch pattern 2. According to the configuration of the present modification, even when the dielectric constant of the windshield 10 as the mounting surface differs by approximately 10% from a target value specified as a product specification, it is possible to provide a gain substantially equal to a gain in a case where the dielectric constant of the windshield 10 as the mounting surface is equal to the target value. That is, it is possible to increase the robustness with respect to variations in the dielectric constant of the windshield 10 as the mounting surface. The target value corresponds to a target value on manufacture (in other words, the design value).

The mode in which the antenna module 100 is used in a state affixed to the inner face of the windshield 10 has been described above. However, a usage mode of the antenna module 100 is not limited thereto. The antenna module 100 may be used in a state affixed to the inner face of a rear glass or a glass as a window disposed on the side face part of the vehicle (hereinbelow, the side glass). The windshield 10, the rear glass, and the side glass correspond to a window glass. The window glass is, for example, a transparent member that closes a window disposed on the vehicle, such as a front window, a window disposed on the side face part of a vehicle Hv (so-called the side window), or a rear window. The principal material of the window glass is not limited to glass. The window glass may be made of resin having a predetermined transmittance. That is, the configuration corresponding to the window glass such as the windshield 10 may be made of resin glass.

The antenna module 100 can also be affixed to the inner face of the windshield 10 in an attitude in which the operating direction faces the inside of the vehicle. For example, when the antenna module 100 is configured as an antenna for receiving a radio wave of Bluetooth (registered trademark) or Wi-Fi (registered trademark), the configuration in which the antenna module 100 is affixed to the upper end of the windshield 10 in an attitude in which the operating direction faces the inside of the cabin easily receives a radio wave from a mobile terminal such as a smartphone carried into the cabin by a user.

[Eighth Modification]

Figure 17:
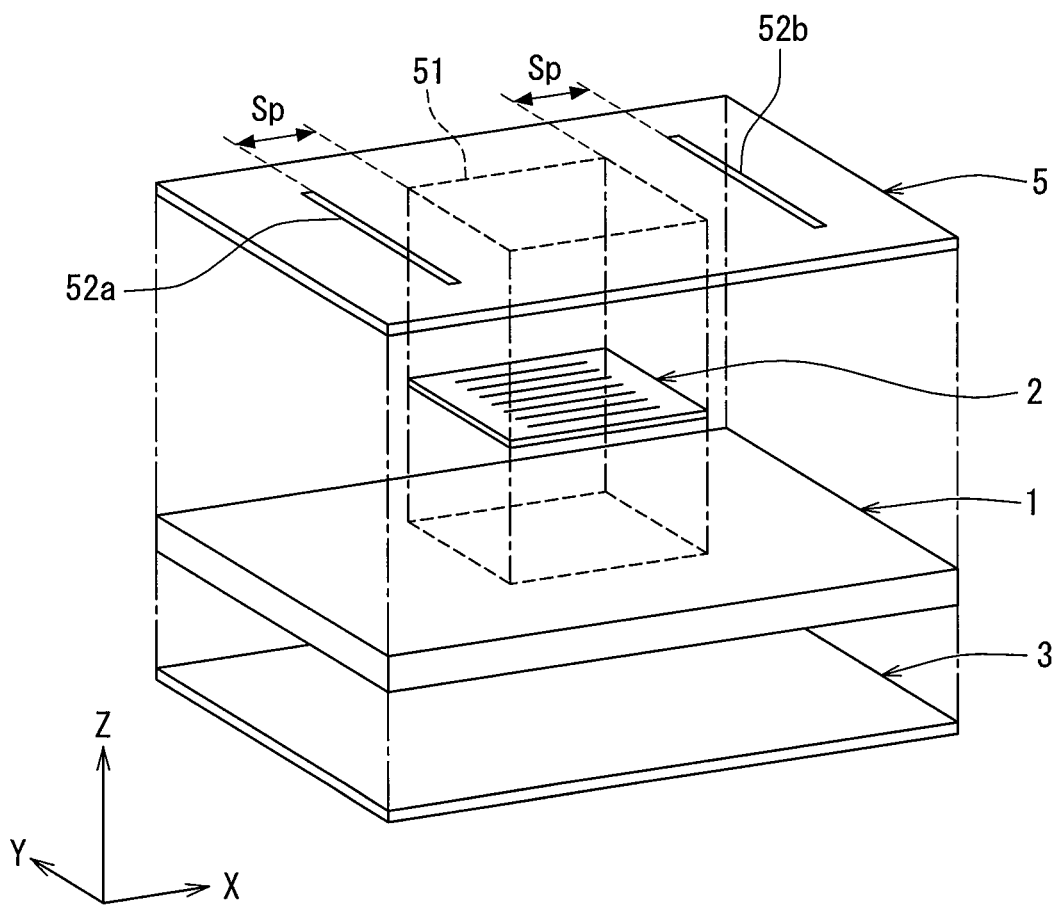
FIG. 17 is a diagram for describing the configuration of an antenna module in an eighth modification.

The antenna module 100 can employ a configuration disclosed below as an eighth modification. The antenna module 100 according to the eighth modification corresponds to a modification of the configuration disclosed in the seventh modification. As illustrated in FIG. 17, the antenna module 100 of the eighth modification is provided with the transparent base 1, the patch pattern 2, the ground pattern 3, and the second transparent base 5. FIG. 17 is an exploded perspective view of the antenna module 100 in the present modification. The technical significance of each member is as described in the first embodiment and the various modifications.

The first transparent base 1 and the second transparent base 5 in the present modification are larger than the patch pattern 2 as illustrated in FIG. 17. For example, the length in the X-axis direction of the first transparent base 1 and the second transparent base 5 is set to three times the length in the X-axis direction of the patch pattern 2. The length in the Y-axis direction of the first transparent base 1 and the second transparent base 5 is set to three times the length in the Y-axis direction of the patch pattern 2. The scaling factor of the dimension in each direction can be appropriately changed and is not limited to the above example. For example, the length in the Y-axis direction of the first transparent base 1 and the second transparent base 5 may be set to 1.5 times or twice the length in the Y-axis direction of the patch pattern 2.

The ground pattern 3 is formed over the entire back face of the first transparent base 1. The ground pattern 3 may be locally formed on the back face of the first transparent base 1. It is only required that the ground pattern 3 be formed in a part facing the patch pattern 2 in the first transparent base 1.

The second transparent base 5 includes slits 52a, 52b each of which has a straight line shape. The slits 52a, 52b are formed parallel to the Y axis on the left side and the right side of an antenna contact part 51 which comes into contact with the patch pattern 2. Each of the slits 52a, 52b is a cut-away structure. The slit 52 corresponds to an opening that exposes the patch pattern 2 or the first transparent base 1 which is formed directly below the second transparent base 5.

The left side of the antenna contact part 51 indicates the negative side in the X-axis direction. The right side of the antenna contact part 51 indicates the positive side in the X-axis direction. As described in the first embodiment, the resonance current direction in the configuration of the present modification is parallel to the X axis. That is, the above formation mode of the slits 52*a*, 52*b* corresponds to an example of a configuration in which the slits 52*a*, 52*b* are formed perpendicularly to the resonance current direction.

The slit 52*a* is a slit 52 that is formed on the left side of the antenna contact part 51. The slit 52*b* is a slit 52 that is formed on the right side of the antenna contact part 51. When the slits 52*a*, 52*b* are not distinguished from each other, the slits 52*a*, 52*b* are referred to as the slits 52. Each of the slits 52 is formed at a position whose distance from the antenna contact part 51 electrically corresponds to 0.5λ. That is, a separation distance Sp in the X-axis direction between the antenna contact part 51 and the slit 52 is set to a value electrically corresponding to 0.5λ. The width of the slits 52 may be appropriately set. The length of the slits 52 may be set equal to or longer than the length in the Y-axis direction of the antenna contact part 51. Each of the slits 52 is formed in such a manner that the center point thereof is located on a straight line that is parallel to the X axis and passes through the center of the antenna contact part 51. That is, the two slits 52 are disposed to sandwich the antenna contact part 51 in the resonance current direction.

Such a configuration makes it possible to prevent a reduction in the gain that occurs when the antenna module 100 is used in a state affixed to the windshield 10 by an action as described below. In the configuration in which the second transparent base 5 is interposed as an intermediate layer between the mounting surface and the patch pattern 2, some of the radio waves emitted by the patch pattern 2 are repeatedly reflected by member boundary surfaces and propagate from the central part to the right and left sides within the second transparent base 5. That is, a surface wave may be formed within the second transparent base 5 as the intermediate layer. The member boundary surfaces include the mounting surface and the surface of the patch pattern 2. It is desired for the antenna module 100 to form the directivity to the outside of the windshield 10. Thus, such a surface wave reduces the gain.

In view of the above problem, according to the configuration in which the slits 52 are formed at the positions electrically 0.5λ away from the antenna contact part 51, the slits 52 function as elements (so-called choke) that block propagation of radio waves. Thus, it is possible to prevent the formation of a surface wave. As a result, it is possible to prevent a reduction in the gain as an antenna.

A gap between the first transparent base 1 and the second transparent base 5 which may be formed around the patch pattern 2 due to the thickness of the patch pattern 2 may be filled with a material similar to the material of the first transparent base 1. The gap between the first transparent base 1 and the second transparent base 5 which may be formed around the patch pattern 2 may be filled with a material similar to the material of the second transparent base 5. The gap between the first transparent base 1 and the second transparent base 5 which may be formed around the patch pattern 2 may be filled with a transparent material that differs from both the material of the first transparent base 1 and the material of the second transparent base 5. The gap between the first transparent base 1 and the second transparent base 5 which may be formed around the patch pattern 2 may be hollow. In addition, when the thickness of the patch pattern 2 is negligible, the second transparent base 5 may be stacked on the first transparent base 1 provided with the patch pattern 2. That is, the first transparent base 1 and the second transparent base 5 may be directly joined together around the patch pattern 2.

Second Embodiment

The antenna module 100 as the light-transmissive antenna described above can be employed as, for example, an antenna of a communication module that is used in a state affixed to the inner face of the windshield 10 of the vehicle (hereinbelow, the window affixing type communication module). In the present embodiment, a window affixing type communication module 200 to which the configuration of the above antenna module 100 is applied will be described.

Figure 18:
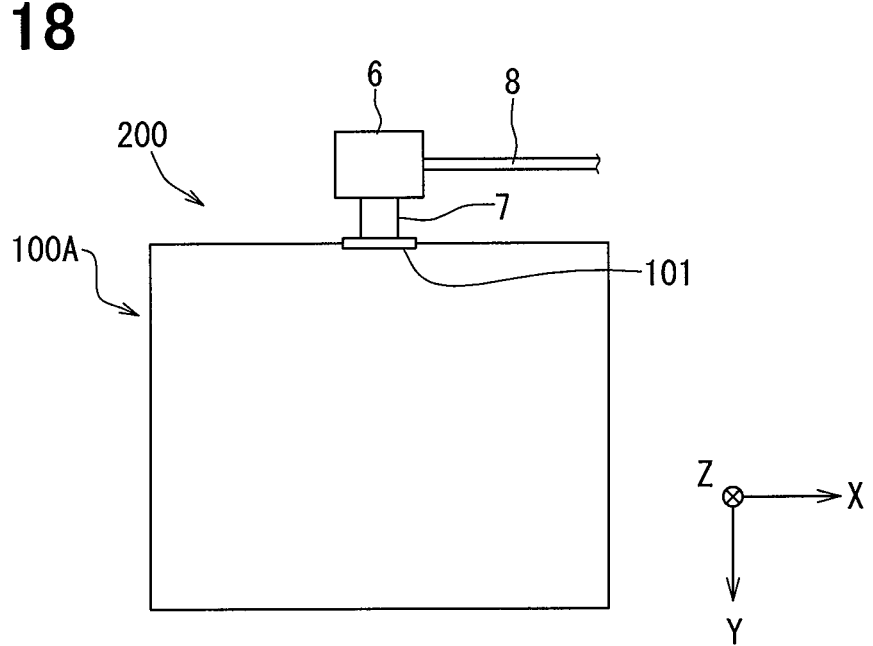
FIG. 18 is a diagram for describing the configuration of a window affixing type communication module according to a second embodiment.

As illustrated in FIG. 18, the window affixing type communication module 200 is provided with an antenna module 100A and a signal processor 6. The antenna module 100A corresponds to, for example, the antenna module 100 according to the eighth modification. The antenna module 100A is provided with a plurality of patch patterns 2 as described below. That is, the antenna module 100A is provided with a plurality of antennas.

The signal processor 6 executes predetermined signal processing on a signal received by the antenna module 100A. The signal processor 6 is provided with, for example, a demodulator circuit which demodulates a received signal. The signal processor 6 may be provided with a drive circuit which supplies high-frequency power to the antenna module 100 to cause the antenna module 100A to transmit a radio signal.

Further, the signal processor 6 may be provided with a function of detecting an object by analyzing signals received by the plurality of antennas (hereinbelow, the object detecting function). For example, the signal processor 6 transmits radio waves as probing waves from the antenna module 100A and receives radio waves which are the probing waves reflected by an object by the plurality of antennas included in the antenna module 100A. The signal processor 6 estimates the distance from the object to be detected and the position of the object on the basis of a phase difference and the strength of the signals received by the respective antennas. Various configurations and algorithms can be employed as a configuration and an algorithm for detecting an object on the basis of the received signals.

The signal processor 6 includes one or more dedicated ICs and various analog circuit elements. The signal processor 6 may include a computer provided with a CPU, a RAM, and a ROM. The computer which constitutes the signal processor 6 may include an MPU or a GPU instead of the CPU. Of course, the computer may include a CPU, an MPU, a GPU, and an IC in combination.

The signal processor 6 is electrically connected to the antenna module 100A through a communication cable 7 such as a coaxial cable or a flexible cable. The signal processor 6 is connected to an external device (e.g., a predetermined electronic control unit (ECU)) through a predetermined communication cable 8. A connector 101 for connection with the communication cable 7 is formed on the end of the antenna module 100A. The antenna module 100A is connected to the signal processor 6 through the connector 101 and the communication cable 7. The communication cable 7 is provided with a ground line which provides a ground potential and a signal line through which a signal flows. The communication cable 7 serves as a feeding cable for the antenna module 100A.

Figure 19:
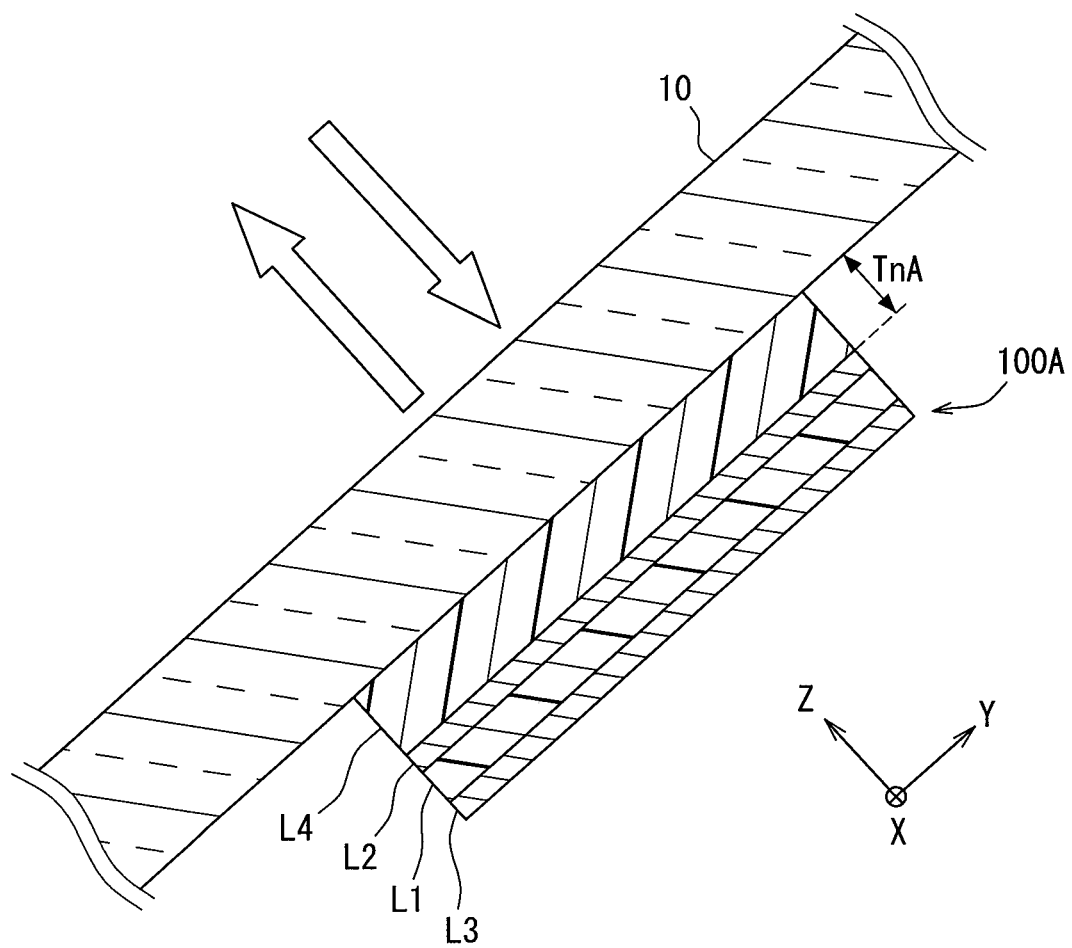
FIG. 19 is a diagram for describing the configuration of an antenna module according to the second embodiment.

As illustrated in FIG. 19, the antenna module 100A is provided with a first transparent base layer L1, a radiating element layer L2 which is disposed on the upper side of the first transparent base layer L1, a ground layer L3 which is disposed on the lower side of the first transparent base layer L1, and a second transparent base layer L4 which is disposed on the upper side of the radiating element layer L2. White arrows in FIG. 19 indicate transmission and reception directions of the antenna module 100A.

Figure 20:
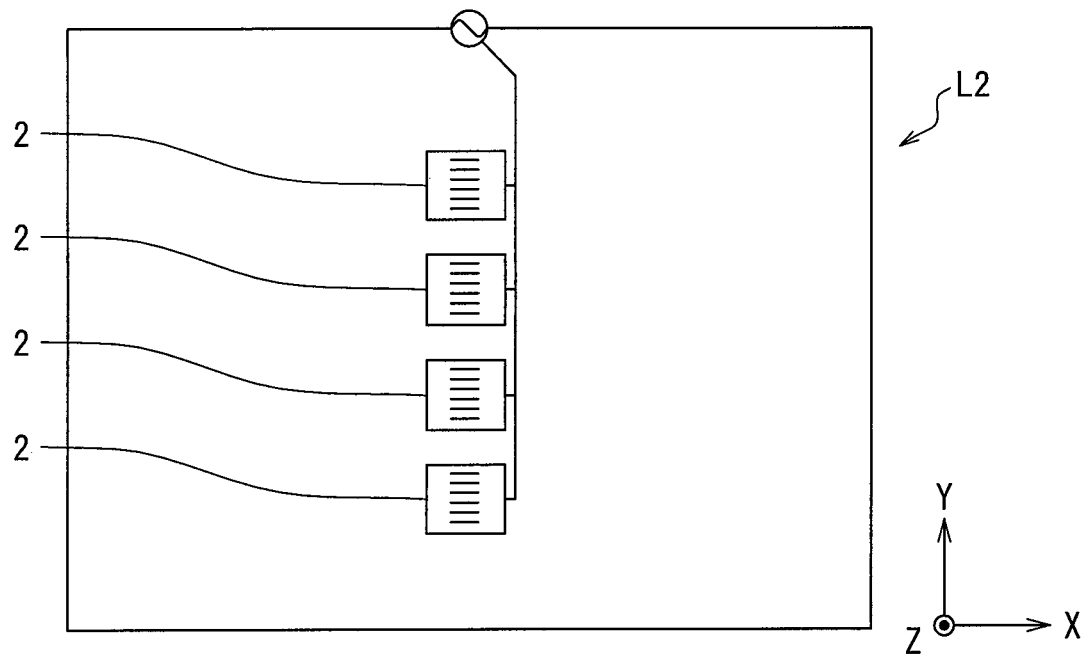
FIG. 20 is a conceptual diagram illustrating the configuration of a radiating element layer of the second embodiment.

The first transparent base layer L1 corresponds to the first transparent base 1 described above. Various materials can be employed as the material of the first transparent base layer L1 as described in the first embodiment. The radiating element layer L2 is provided with at least one patch pattern 2. In the present embodiment, as an example, the radiating element layer L2 is provided with four patch patterns 2 as illustrated in FIG. 20. The four patch patterns 2 are arranged in a row in parallel to the Y axis on the central part in the X-axis direction of the radiating element layer L2.

A part of the radiating element layer L2 excepting the patch patterns 2 may be filled with a material similar to the material of the first transparent base layer L1 or the material of the second transparent base layer L4. The part of the radiating element layer L2 excepting the patch patterns 2 may be filled with a transparent material that differs from both the material of the first transparent base 1 and the material of the second transparent base 5 or may be hollow. In addition, when the thickness of the patch patterns 2 is negligible, the second transparent base layer L4 may be stacked after arranging the patch patterns 2 at predetermined positions on the first transparent base layer L1. The number and the arrangement mode of patch patterns 2 included in the radiating element layer L2 can be appropriately changed.

Each of the patch patterns 2 is electrically connected to the signal line of the communication cable 7 through the connector 101. The length in the X-axis direction of each of the patch patterns 2 is set to a length electrically corresponding to $0.5\lambda$. Each of the patch patterns 2 is configured to operate as a patch antenna. The resonance current flows in the X-axis direction in the patch pattern 2.

The ground layer L3 is a layer on which a transparent electrically conductive film as the ground pattern 3 is disposed. In the present embodiment, as an example, the ground pattern 3 as the ground layer L3 is formed over the entire back face of the first transparent base layer L1. The ground layer L3 is electrically connected to the signal line of the communication cable 7, the signal line providing the ground potential, through the connector 101. As another mode, the ground pattern 3 as the ground layer L3 may be locally formed on the back face of the first transparent base layer L1 including a part facing the patch patterns 2 of the radiating element layer L2.

The second transparent base layer L4 corresponds to the second transparent base 5 described in the seventh modification and the eighth modification. The second transparent base layer L4 is also made of any transparent dielectric material. Various materials can be employed as the material of the first transparent base layer L1 and the material of the second transparent base layer L4.

A thickness TnA of the second transparent base layer L4 is set to a value electrically corresponding to $0.5\lambda$ on the basis of the technical idea described in the seventh modification. The value corresponding to $0.5\lambda$ indicates a value within a predetermined allowable range determined based on $0.5\lambda$ such as $0.5\lambda \pm 0.1\lambda$. The expression of "$0.1\lambda$" indicates a length obtained by multiplying the wavelength of the target radio wave by 0.1. The allowable range corresponds to a range in which an effect of preventing a gain reduction caused by a reflected wave on a glass surface (in other words, the gain increasing effect) can be obtained. The thickness TnA of the second transparent base layer L4 may be set to electrically an integral multiple (e.g., twice or three times) of half the target wavelength.

The second transparent base layer L4 includes slits 52 each of which has a straight line shape. The slits 52 are formed along the Y-axis direction on lateral sides of a plurality of antenna contact parts 51 which come into contact with the respective patch patterns 2. The two slits 52 are formed to sandwich the plurality of antenna contact parts 51 which are arranged in a row along the Y-axis direction. The formation mode of the slits 52 corresponds to an example of the configuration in which the slits 52a, 52b are formed perpendicularly to the resonance current flow direction in the patch pattern 2.

Figure 21:
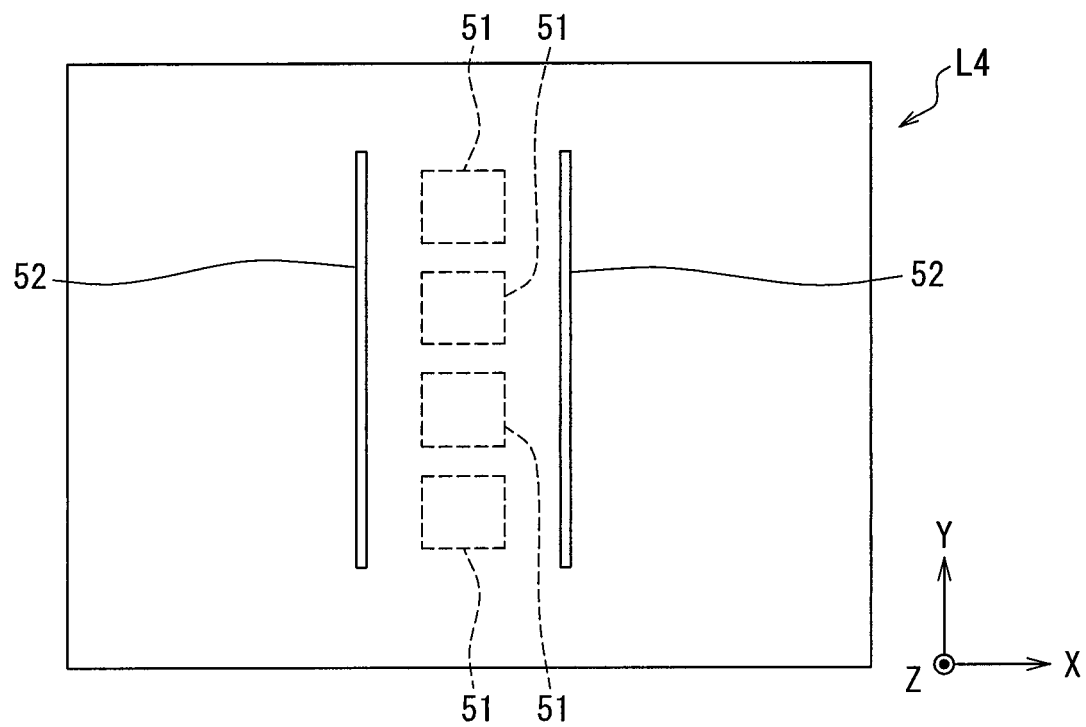
FIG. 21 is a conceptual diagram illustrating the configuration of a second transparent base layer.

A separation distance Sp between each of the slits 52 and the antenna contact parts 51 is set to a value electrically corresponding to $0.5\lambda$. FIG. 21 discloses, as an example, a mode in which each of the slits 52 is continuously formed. However, the present disclosure is not limited thereto. The slit 52 may be intermittently formed (in other words, formed in a broken line shape).

Figure 22:
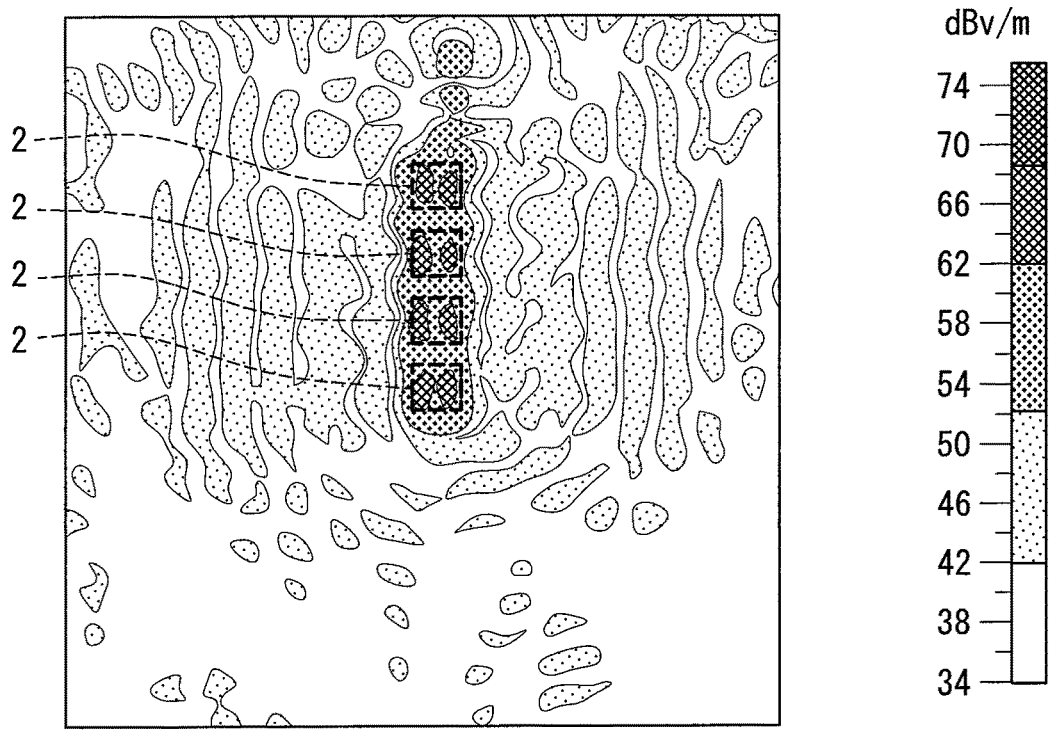
FIG. 22 is a diagram illustrating a formation state of a surface wave in a comparative configuration.
Figure 23:
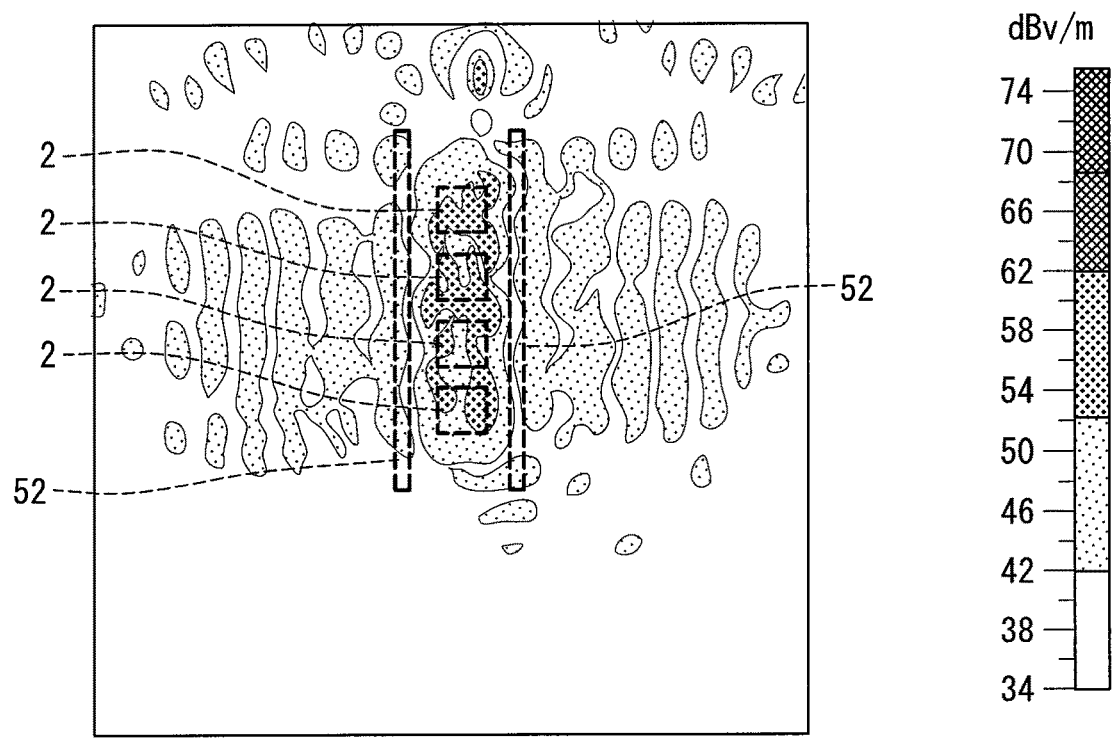
FIG. 23 is a diagram illustrating a formation state of a surface wave in the configuration of the second embodiment.
Figure 24:
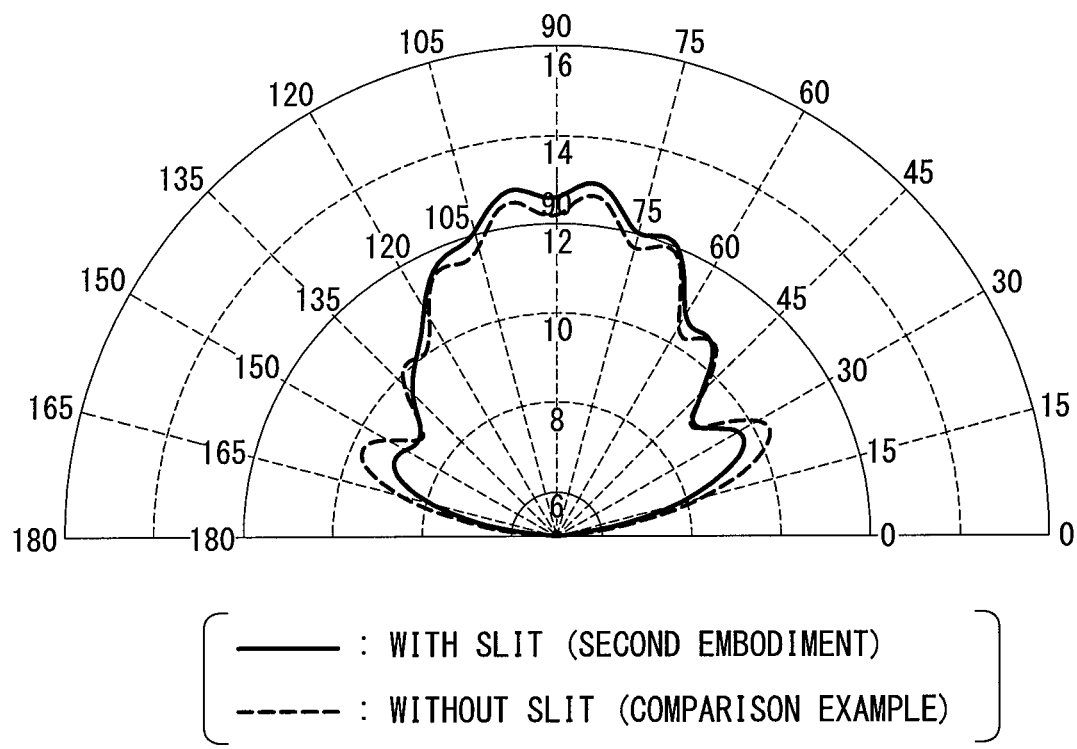
FIG. 24 is a diagram illustrating an effect obtained by slits formed on the second transparent base layer.

The configuration in which the slits 52 are formed on the lateral sides of the antenna contact parts 51 in this manner makes it possible to more reliably prevent the generation of a surface wave than the configuration in which no slit 52 is formed as illustrated in FIGS. 22 to 24. As a result, it is possible to increase the gain in the perpendicular-to-antenna direction. FIG. 22 illustrates a result of a simulation of an electric field strength on the boundary surface between the second transparent base layer L4 and the windshield 10 in the configuration including no slit 52 (hereinbelow, the comparative configuration). FIG. 23 illustrates a result of a simulation of an electric field strength on the boundary surface between the second transparent base layer L4 and the windshield 10 in the configuration including the slits 52 (that is, the configuration of the present embodiment). FIG. 24 illustrates a result of a simulation of the directivity in each of the comparative configuration and the configuration of the present embodiment.

A solid line in FIG. 24 indicates the directivity in the configuration of the present embodiment, that is, the configuration in which the second transparent base layer L4 is provided with the slits 52. A solid line in FIG. 24 indicates the directivity in the comparative configuration.

Third Embodiment

The antenna modules 100, 100A described above can be used as an antenna for transmitting and receiving a probing wave in a radar device (e.g., a millimeter wave radar) as described in the beginning of the first embodiment. Hereinbelow, a periphery monitoring unit 300 which is provided with the antenna module 100A as an antenna for transmitting and receiving a probing wave will be described with reference to the drawings.

Figure 25:
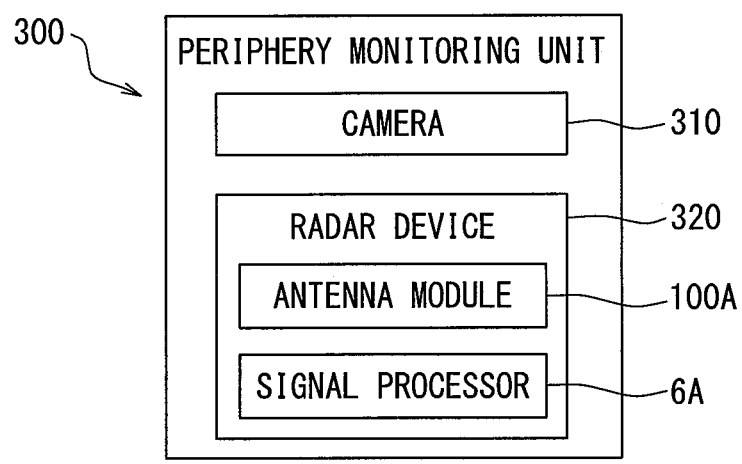
FIG. 25 is a block diagram illustrating a schematic configuration of a periphery monitoring unit according to a third embodiment.
Figure 26:
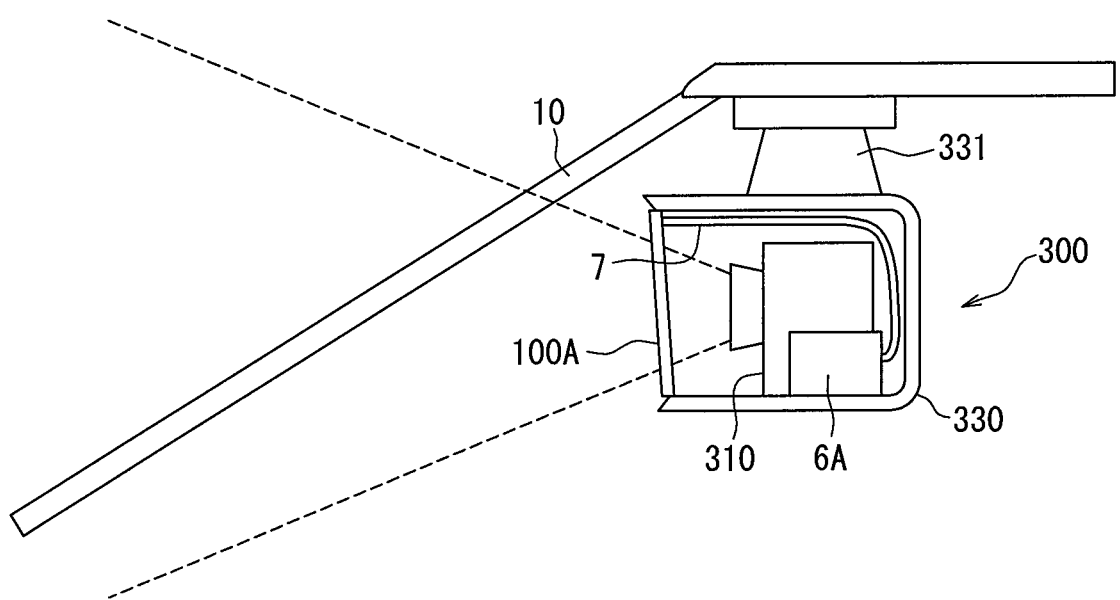
FIG. 26 is a conceptual diagram illustrating an example of an attachment mode of the periphery monitoring unit.
Figure 27:
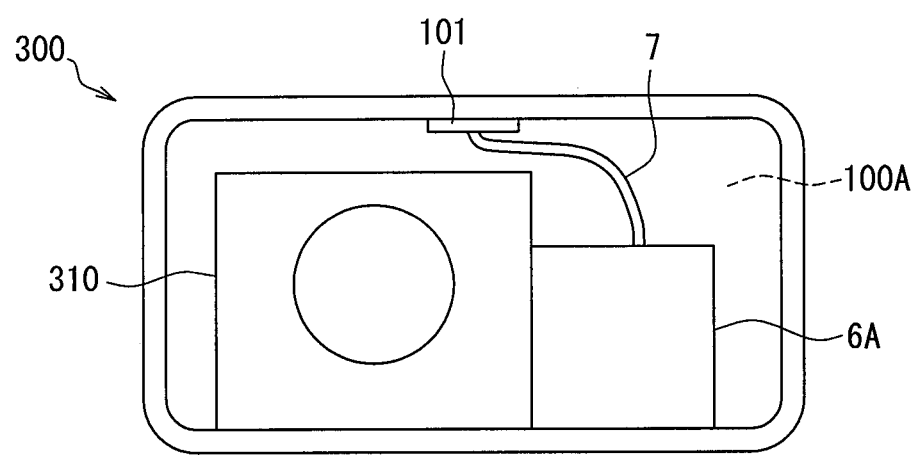
FIG. 27 is a diagram conceptually illustrating the configuration of the periphery monitoring unit viewed from the front.

As illustrated in FIGS. 25 to 27, the periphery monitoring unit 300 according to the present embodiment is provided with a camera 310, a radar device 320, and a housing 330. The camera 310 is a device that captures an image of a unit front side. The unit front side indicates the front side for the periphery monitoring unit 300. The front, rear, right, and left for the periphery monitoring unit 300 is previously set with respect to the periphery monitoring unit 300.

The front side for the periphery monitoring unit 300 corresponds to an imaging direction of the camera 310 in another point of view. A broken line in FIG. 25 conceptually indicates an imaging range (in other words, the field of view) of the camera 310. For example, as illustrated in FIG. 26, the periphery monitoring unit 300 is used in a state attached to the upper end of a windshield 10 of a vehicle near a rearview mirror in an attitude in which the camera 310 captures an image of the front side outside a cabin.

The radar device 320 transmits a radio wave having a predetermined frequency as a probing wave toward the unit front side and receives a reflected wave which is the probing wave reflected by an object to detect the object. The radar device 320 is provided with the antenna module 100A and a signal processor 6A. The antenna module 100A and the signal processor 6A are capable of communicating with each other using a connector 101 and a communication cable 7. The signal processor 6A is provided with a drive circuit for supplying high-frequency current to the antenna module 100A to cause the antenna module 100A to transmit the probing wave. Further, the signal processor 6A is provided with a function of generating data indicating the position of an object by analyzing a signal received by the antenna module 100A.

The housing 330 houses the camera 310 and the signal processor 6A therein. The housing 330 is provided with a mount 331. The mount 331 is a configuration for attaching the periphery monitoring unit 300 to a predetermined position inside the cabin. The present embodiment discloses, as an example, a mode in which the periphery monitoring unit 300 is attached to a ceiling inside the cabin near a joint part between the ceiling and the windshield. However, the present disclosure is not limited thereto. The periphery monitoring unit 300 may be attached to the inner face of the windshield 10. Further, the periphery monitoring unit 300 may be attachable to the rearview mirror. Further, the periphery monitoring unit 300 may be mountable on the upper end of an instrument panel. As another mode, the periphery monitoring unit 300 may be attached to any position near a rear glass in an attitude in which the unit front side faces the vehicle rear direction.

The front side part (hereinbelow, the front face part) of the housing 330 of the present embodiment is formed in an open shape so that the camera 310 is capable of capturing an image of the unit front side. That is, the housing 330 is provided with an opening for the camera 310 to capture an image of the unit front side on the front face part thereof. The antenna module 100A having a predetermined hardness (hereinbelow, the target hardness) is disposed in the opening of the housing 330 so that the antenna module 100A functions as a partition that separates the inside and the outside of the housing 330.

Such a configuration corresponds to a configuration in which the antenna module 100A as the light-transmissive antenna is disposed within the imaging range of the camera. The antenna module 100A is transparent. Thus, the antenna module 100A inserted in the front face part of the housing 330 functions as a window for the camera 310 to capture an image of the outside of the unit. Further, since the antenna module 100A is transparent, even when the antenna module 100A is present in front of the camera 310 (that is, in the imaging range), the antenna module 100A is less likely to affect a recognition accuracy of a predetermined ECU when the ECU performs an object recognition based on an image captured by the camera 310.

The antenna module 100A inserted in the front face part of the housing 330 functions as the window for the camera 310 and also serves as a member that protects a stored object such as the camera 310. The configuration in which the antenna module 100A is inserted in the front face part of the housing 330 so as to function as the partition that separates the inside and the outside of the housing 330 corresponds to a configuration in which the antenna module 100 is used as the front face part of the housing 330. In addition, the antenna module 100A serves as an antenna for transmitting and receiving the probing wave by the radar device 320.

The antenna module 100A having the target hardness, for example, includes the second transparent base layer L4 formed of a resin material having the target hardness. Of course, as another mode, the antenna module 100A having the target hardness may include the first transparent base layer L1 formed of a resin material having the target hardness.

The above configuration corresponds to a configuration in which an antenna for transmitting and receiving the probing wave is disposed on the front face of the camera 310 in a unit in which the camera 310 and the radar device 320 are integrated. The antenna module 100A as the antenna for transmitting and receiving the probing wave is transparent. Thus, the antenna module 100A is less likely to obstruct the object recognition based on an image captured by the camera 310. In addition, according to the above configuration, the antenna module 100A is disposed within the viewing angle of the camera 310. Thus, it is possible to reduce the size of the periphery monitoring unit 300 in which the camera 310 and the radar device 320 are integrated.

Figure 28:
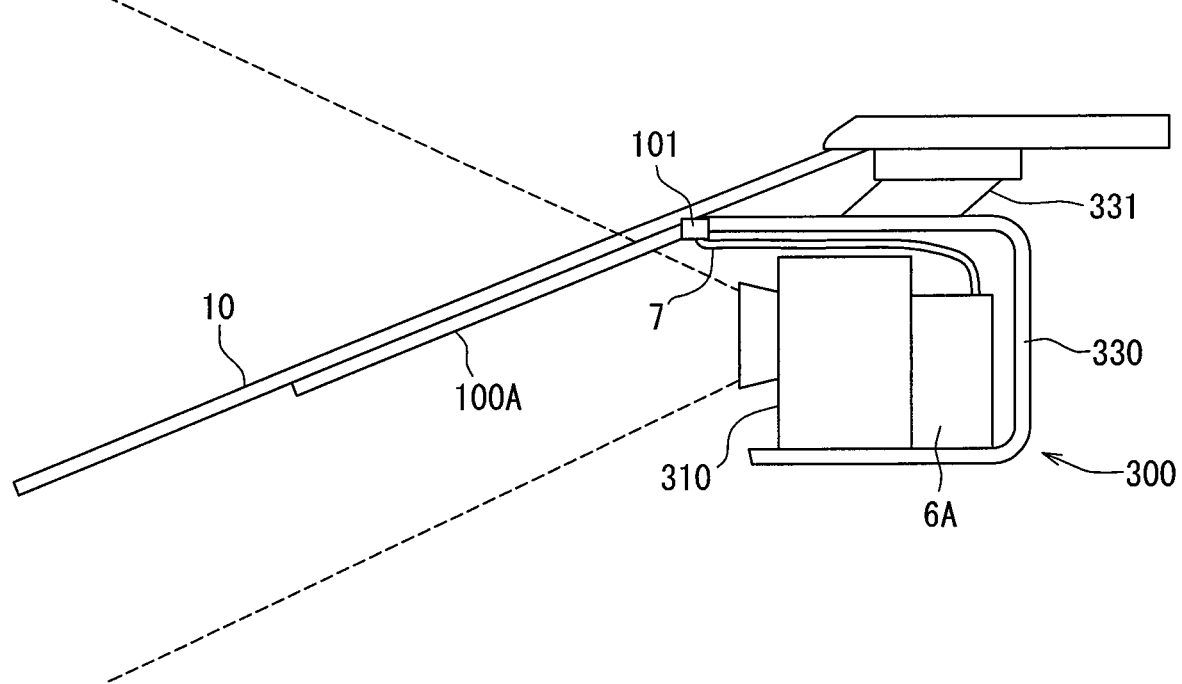
FIG. 28 is a conceptual diagram illustrating an example of a modification of the configuration of the periphery monitoring unit.

The above embodiment discloses the configuration in which the antenna module 100A is used as a part of the housing 330. However, the present disclosure is not limited thereto. As illustrated in FIG. 28, the antenna module 100A may be affixed to the inner face of the windshield 10. The disposition mode of the signal processor 6A and the camera 310 inside the housing 330 can be appropriately changed. The signal processor 6A may be disposed on the lateral side of the camera 310 as illustrated in FIG. 27 or may be disposed on the back side of the camera 310 as illustrated in FIG. 28.

What is claimed is:

1. A light-transmissive antenna comprising:
    a transparent base made of a transparent insulating material;
    an antenna pattern formed on the transparent base, the antenna pattern being made of a transparent electrically conductive film that is a film-like member having a predetermined transmittance and a predetermined electrical conductivity;
    a plurality of highly electrically conductive patterns arranged on the antenna pattern, each of the highly electrically conductive patterns being made of an electrically conducive member having a higher electrical conductivity than the transparent electrically conductive film and formed in a linear shape; and
    a second transparent base disposed on the upper side of the antenna pattern and having a predetermined thickness, wherein
        the second transparent base is made of a transparent insulating material,
    each of the plurality of highly electrically conductive patterns has a predetermined width set equal to or smaller than a value assumed as a resolution of human eyes, the antenna pattern is formed in a rectangular shape whose length of one side is set to a length corresponding to a half wavelength of a radio wave to be transmitted and received or a circular shape whose diameter is set to a length corresponding to a half wavelength of a radio wave to be transmitted and received so as to operate as a radiating element of a patch antenna, a ground pattern made of the transparent electrically conductive film is disposed on a face of the transparent base, the face of the transparent base being opposite to a face having the antenna pattern, so as to face the antenna pattern, the ground pattern includes a plurality of ground side highly electrically conductive patterns, each of the ground side highly electrically conductive patterns being made of an electrically conductive film and formed in a linear shape, and a width of each of the plurality of ground side highly electrically conductive patterns is set equal to or smaller than the value assumed as the resolution of human eyes.

2. The light-transmissive antenna according to claim 1, wherein the plurality of highly electrically conductive patterns are arranged along a flow direction of current induced during resonance.

3. The light-transmissive antenna according to claim 2, wherein each of the plurality of highly electrically conductive patterns is formed in a straight line shape, the plurality of highly electrically conductive patterns each having a straight line shape are arranged parallel to each other at predetermined intervals, and the interval between the highly electrically conductive patterns is set to a value sufficiently larger than the width of each of the highly electrically conductive patterns.

4. The light-transmissive antenna according to claim 1, wherein the highly electrically conductive patterns are arranged in a region where current induced during resonance is concentrated in the antenna pattern.

5. The light-transmissive antenna according to claim 1, wherein the ground side highly electrically conductive patterns are arranged facing the highly electrically conductive patterns included in the antenna pattern.

6. The light-transmissive antenna according to claim 1, wherein the second transparent base includes a slit having a straight line shape, the slit being formed perpendicularly to a flow direction of current in the antenna pattern on a lateral side of an antenna contact part that comes into contact with the antenna pattern.

7. A window affixing type communication module comprising:

an antenna module as the light-transmissive antenna according to claim 1; and a signal processor that executes predetermined signal processing on a signal received by the antenna module, wherein the antenna module is used in a state affixed to an inner face of a window glass of a vehicle, the antenna module includes:

a first transparent base layer as the transparent base;

a radiating element layer disposed on the upper side of the first transparent base layer and including at least the one antenna pattern; and a ground layer disposed on the lower side of the first transparent base layer and made of the transparent electrically conductive film, the antenna module is used in a state affixed to the window glass with the radiating element layer facing the window glass, and a second transparent base layer having a predetermined thickness, the second transparent base layer being made of a transparent insulating material, is formed on the upper side of the radiating element layer.

8. The window affixing type communication module according to claim 7, wherein the thickness of the second transparent base layer is set to a value electrically corresponding to an integral multiple of a half wavelength of a target radio wave to be transmitted and received by the antenna module.

9. The window affixing type communication module according to claim 7, wherein the second transparent base layer includes a slit formed in a direction perpendicular to a flow direction of current in the antenna pattern on a lateral side of an antenna contact part that comes into contact with the antenna pattern.

10. The window affixing type communication module according to claim 9, wherein a separation distance between the slit and the antenna contact part is set to a value electrically corresponding to half a wavelength of a radio wave to be transmitted and received by the antenna module.

11. A periphery monitoring unit comprising:

a camera; and a radar device that transmits a radio wave having a predetermined frequency as a probing wave and receives a reflected wave that is the probing wave reflected by an object to detect the object, wherein the radar device includes:

an antenna module as the light-transmissive antenna according to claim 1 as an antenna for receiving the reflected wave; and a signal processor that executes predetermined signal processing on a signal received by the light-transmissive antenna to generate data indicating a position of the object, and the antenna module is disposed on the front side of the camera at a position where at least a part of the antenna module is included in an imaging range of the camera.

12. A light-transmissive antenna comprising:

a transparent base made of a transparent insulating material;

an antenna pattern formed on the transparent base, the antenna pattern being made of a transparent electrically conductive film that is a film-like member having a predetermined transmittance and a predetermined electrical conductivity;

a plurality of highly electrically conductive patterns arranged on the antenna pattern, each of the highly electrically conductive patterns being made of an electrically conducive member having a higher electrical conductivity than the transparent electrically conductive film and formed in a linear shape; and a second transparent base disposed on the upper side of the antenna pattern and having a predetermined thickness, wherein the second transparent base is made of a transparent insulating material, each of the plurality of highly electrically conductive patterns has a predetermined width set equal to or smaller than a value assumed as a resolution of human eyes, and the second transparent base includes a slit having a straight line shape, the slit being formed perpendicularly to a flow direction of current in the antenna pattern on a lateral side of an antenna contact part that comes into contact with the antenna pattern.

13. The light-transmissive antenna according to claim 12, wherein the antenna pattern is formed in a rectangular shape whose length of one side is set to a length corresponding to a half wavelength of a radio wave to be transmitted and received or a circular shape whose diameter is set to a length corresponding to a half wavelength of a radio wave to be transmitted and received so as to operate as a radiating element of a patch antenna, and a ground pattern made of the transparent electrically conductive film is disposed on a face of the transparent base, the face of the transparent base being opposite to a face having the antenna pattern, so as to face the antenna pattern.

14. The light-transmissive antenna according to claim 13, wherein the ground pattern includes a plurality of ground side highly electrically conductive patterns, each of the ground side highly electrically conductive patterns being made of an electrically conductive member having a higher electrical conductivity than the transparent electrically conductive film and formed in a linear shape, and a width of each of the plurality of ground side highly electrically conductive patterns is set equal to or smaller than the value assumed as the resolution of human eyes.

15. The light-transmissive antenna according to claim 14, wherein the ground side highly electrically conductive patterns are arranged facing the highly electrically conductive patterns included in the antenna pattern.

* * * * *